US012328045B2

(12) United States Patent
Kouda

(10) Patent No.: US 12,328,045 B2
(45) Date of Patent: Jun. 10, 2025

(54) ELECTRIC WORK MACHINE

(71) Applicant: MAKITA CORPORATION, Anjo (JP)

(72) Inventor: Kei Kouda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 328 days.

(21) Appl. No.: 17/890,434

(22) Filed: Aug. 18, 2022

(65) Prior Publication Data

US 2023/0066000 A1    Mar. 2, 2023

(30) Foreign Application Priority Data

Aug. 25, 2021  (JP) ................................ 2021-137332
Sep. 9, 2021   (JP) ................................ 2021-147103

(51) Int. Cl.
| | |
|---|---|
| H02K 21/12 | (2006.01) |
| H02K 1/27 | (2022.01) |
| H02K 1/278 | (2022.01) |
| H02K 3/34 | (2006.01) |
| H02K 7/14 | (2006.01) |
| H02K 11/215 | (2016.01) |

(52) U.S. Cl.
CPC ............. *H02K 21/12* (2013.01); *H02K 1/278* (2013.01); *H02K 3/34* (2013.01); *H02K 7/145* (2013.01); *H02K 11/215* (2016.01)

(58) Field of Classification Search
CPC .......... H02K 21/12; H02K 1/278; H02K 3/34; H02K 7/145; H02K 11/215; H02K 2203/09; H02K 3/28; H02K 3/522; H02K 1/276; H02K 2213/03; H02K 21/16
See application file for complete search history.

(56) References Cited

U.S. PATENT DOCUMENTS

| | | | |
|---|---|---|---|
| 8,339,010 B2 | 12/2012 | Atarashi et al. | |
| 2002/0180294 A1 | 12/2002 | Kaneda et al. | |
| 2006/0273684 A1* | 12/2006 | Ishikawa ................ | H02K 1/278 310/156.47 |

(Continued)

FOREIGN PATENT DOCUMENTS

| | | |
|---|---|---|
| CN | 208707414 U | 4/2019 |
| JP | 2002354721 A | 12/2002 |

(Continued)

OTHER PUBLICATIONS

Office Action from the Japanese Patent Office dispatched Jan. 21, 2025 in counterpart Japanese application No. 2021-137332, and translation thereof.

(Continued)

*Primary Examiner* — Thomas Truong
(74) *Attorney, Agent, or Firm* — J-TEK LAW PLLC; Jeffrey D. Tekanic; Scott T. Wakeman

(57) ABSTRACT

An electric work machine (1) includes: an inner-rotor-type brushless motor (6) having a stator (20) disposed around a rotor (30); and an output part (10), which is directly or indirectly driven by the rotor. The rotor comprises a rotor core (32) and eight permanent magnets (33) fixed to the rotor core. The stator comprises a stator core (21), one or more insulators (22, 23) fixed to the stator core, and six coils (24), which are respectively wound on teeth (21T) of the stator core via the insulator(s).

19 Claims, 25 Drawing Sheets

(56) References Cited

U.S. PATENT DOCUMENTS

| | | | |
|---|---|---|---|
| 2014/0145524 A1* | 5/2014 | Tanimoto | H02K 1/2706 |
| | | | 310/50 |
| 2015/0069864 A1* | 3/2015 | Nagahama | H02K 3/522 |
| | | | 310/50 |
| 2016/0149463 A1 | 5/2016 | Smith et al. | |
| 2021/0091640 A1 | 3/2021 | Aoyama | |
| 2023/0076631 A1* | 3/2023 | Kouda | B25F 5/00 |
| 2023/0216359 A1* | 7/2023 | Inuzuka | H02K 29/08 |
| | | | 310/50 |

FOREIGN PATENT DOCUMENTS

| | | |
|---|---|---|
| JP | 2017038462 A | 2/2017 |
| JP | 2019180165 A | 10/2019 |
| JP | 2020171178 A | 10/2020 |
| JP | 2021053736 A | 4/2021 |
| WO | 2007072622 A1 | 6/2007 |

OTHER PUBLICATIONS

Office Action from the Japanese Patent Office dispatched Apr. 1, 2025, in counterpart Japanese application No. 2021-137332, and machine translation thereof.

Office Action from the Japanese Patent Office dispatched Apr. 8, 2025, in counterpart Japanese application No. 2021-147103, and machine translation thereof.

\* cited by examiner

<5,000 rpm> MINIMUM AXIAL LENGTH OF STATOR CORE

<5,000 rpm> MINIMUM AXIAL LENGTH OF STATOR CORE

<20,000 rpm> MINIMUM AXIAL LENGTH OF STATOR CORE

<25,000 rpm> MINIMUM AXIAL LENGTH OF STATOR CORE

<25,000 rpm> MINIMUM AXIAL LENGTH OF STATOR CORE

<30,000 rpm> MINIMUM AXIAL LENGTH OF STATOR CORE

FIG.20

CONDITIONS FOR WHICH 8P6S HAS THE SHORTEST AXIAL LENGTH (DRIVE VOLTAGE: 36 V, 20 mΩ)

| THEORETICAL UNLOADED ROTATIONAL SPEED | 5000 | 12000 | 15000 | 20000 | 25000 | 30000 | 35000 | 40000 |
|---|---|---|---|---|---|---|---|---|
| INDUCED VOLTAGE CONSTANT k | 7.2 | 3 | 2.4 | 1.8 | 1.44 | 1.2 | 1.028571 | 0.9 |
| COEFFICIENT α | 0.385802 | 2.222222 | 3.472222 | 6.17284 | 9.645062 | 13.88889 | 18.90432 | 24.69136 |
| STATOR OUTER DIAMETER 40 | × | × | × | × | × | × | × | × |
| 45 | ○ | ○ | ○ | ○ | ○ | ○ | ○ | ○ |
| 50 | ○ | ○ | ○ | ○ | ○ | ○ | ○ | ○ |
| 55 | ○ | ○ | ○ | ○ | ○ | ○ | ○ | ○ |
| 60 | ○ | ○ | ○ | ○ | ○ | ○ | ○ | ○ |
| 65 | ○ | ○ | ○ | × | ○ | × | × | × |
| 70 | ○ | ○ | ○ | × | × | × | × | × |

TOOTH WIDTH <20,000 rpm>

TOOTH WIDTH <25,000 rpm>

FIG.34

| VOLT-AGE [V] | ROTATIONAL SPEED [rpm] | RESIS-TANCE [mΩ] | INDUCED VOLTAGE CONSTANT k [V/krpm] | COEFFICIENT α [mΩ/(V/krpm)²] | CONDITION 1 [k: 0.9 TO 7.2] [α: 0.39 TO 24.69] | CONDITION 2 [k: 1.44 TO 7.2] [α: 0.39 TO 9.65] | CONDITION 3 [k: 2.4 TO 7.2] [α: 0.39 TO 3.47] |
|---|---|---|---|---|---|---|---|
| 36 | 5000 | 20 | 7.20 | 0.39 | ○ | ○ | ○ |
| 36 | 12000 | 20 | 3.00 | 2.22 | ○ | ○ | ○ |
| 36 | 15000 | 20 | 2.40 | 3.47 | ○ | ○ | ○ |
| 36 | 20000 | 20 | 1.80 | 6.17 | ○ | ○ | × |
| 36 | 25000 | 20 | 1.44 | 9.65 | ○ | ○ | × |
| 36 | 30000 | 20 | 1.20 | 13.89 | ○ | × | × |
| 36 | 35000 | 20 | 1.03 | 18.90 | ○ | × | × |
| 36 | 40000 | 20 | 0.90 | 24.69 | ○ | × | × |
| 36 | 4000 | 100 | 9.00 | 1.23 | × | × | × |
| 36 | 5000 | 100 | 7.20 | 1.93 | ○ | ○ | ○ |
| 36 | 20000 | 30 | 1.80 | 9.26 | ○ | ○ | × |
| 36 | 25000 | 30 | 1.44 | 14.47 | ○ | ○ | × |
| 18 | 5000 | 15 | 3.60 | 1.16 | ○ | ○ | ○ |
| 18 | 15000 | 15 | 1.20 | 10.42 | ○ | × | × |
| 18 | 25000 | 15 | 0.90 | 18.52 | ○ | × | × |
| 18 | 25000 | 15 | 0.72 | 28.94 | × | × | × |
| 72 | 5000 | 80 | 14.40 | 0.39 | × | × | × |
| 72 | 12000 | 80 | 6.00 | 2.22 | ○ | ○ | ○ |
| 72 | 15000 | 80 | 4.80 | 3.47 | ○ | ○ | ○ |
| 72 | 30000 | 80 | 2.40 | 13.89 | ○ | × | × |
| 72 | 12000 | 20 | 6.00 | 0.56 | ○ | ○ | ○ |
| 72 | 15000 | 20 | 4.80 | 0.87 | ○ | ○ | ○ |
| 72 | 30000 | 20 | 2.40 | 3.47 | ○ | ○ | ○ |

ELECTRIC WORK MACHINE

CROSS-REFERENCE

This application claims priority to Japanese Patent Application No. 2021-137332 filed on Aug. 25, 2021, and to Japanese Patent Application No. 2021-147103 filed on Sep. 9, 2021, the contents of both of which are incorporated by reference as if fully set forth herein.

TECHNICAL FIELD

Techniques disclosed in the present specification relate to electric work machines, in particular to the design of an electric motor for use in electric work machines.

BACKGROUND ART

US 2021/091640 (A1) discloses a brushless motor for use in an electric work machine.

SUMMARY OF THE INVENTION

In situations in which a brushless motor is used as the power source of an electric work machine, there is demand to make the brushless motor more compact.

One non-limiting object of the present teachings is to disclose techniques that make it possible to design a brushless motor, which is intended to be used as the motive power source (prime mover) of an electric work machine, more compactly.

In one aspect of the present teachings, an electric work machine may comprise: an inner-rotor-type brushless motor comprising a rotor and a stator, which is disposed around the rotor; and an output part, which is directly or indirectly driven by the rotor. The rotor may comprise a rotor core and permanent magnets, which are fixed to (in) the rotor core. The stator may comprise a stator core, one or more insulators fixed to the stator core, and coils, which are respectively wound on teeth of the stator core via the insulator(s). A pole count, which indicates the number of the permanent magnets, may be eight; and a slot count, which indicates the number of the coils, may be six.

According to the above-noted aspect, a brushless motor that can be used as the motive power source of an electric work machine can be made more compact.

BRIEF DESCRIPTION OF THE DRAWINGS

FIG. 20 is a table that shows the relationship between stator outer diameter A and the theoretical unloaded rotational speed of the rotor with respect to whether the length of the stator core in the axial direction is minimal for an 8-pole/6-slot combination.

FIG. 34 is a table that shows the relationships among drive voltage, rotational speed, motor resistance, induced voltage constant k, and coefficient α for an 8-pole/6-slot motor.

DETAILED DESCRIPTION OF THE INVENTION

Figure 1:
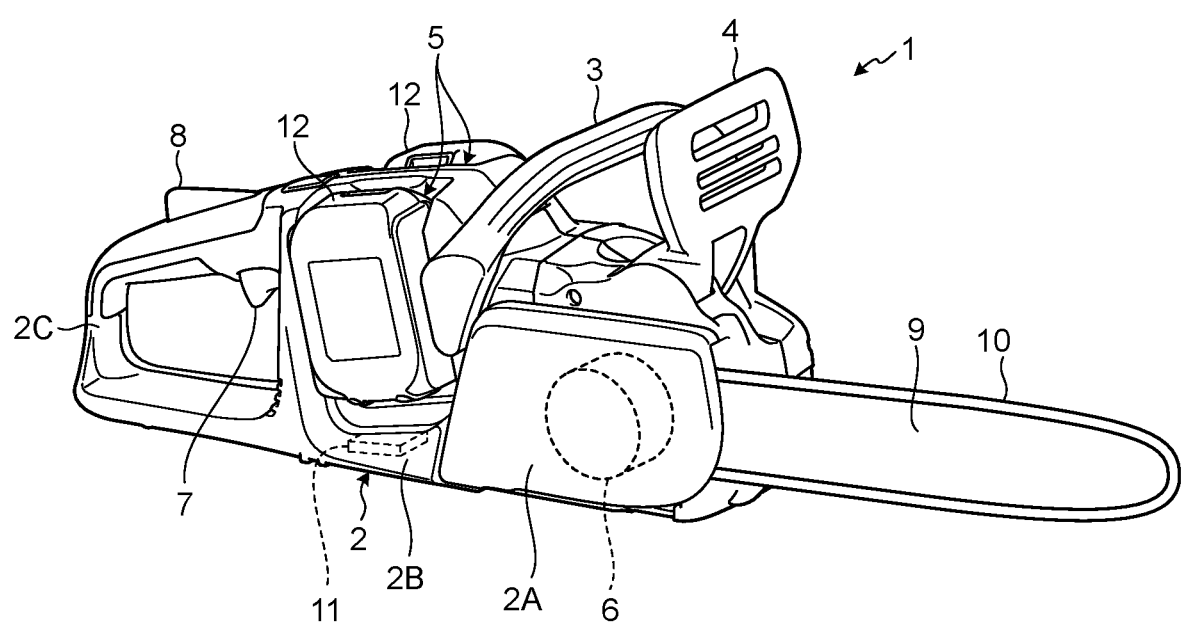
FIG. 1 is an oblique view that shows an electric work machine according to an embodiment of the present teachings.

In one or more embodiments, an electric work machine may comprise: an inner-rotor-type brushless motor comprising a rotor and a stator, which is disposed around the rotor; and an output part, which is directly or indirectly driven by the rotor. The rotor may comprise a rotor core and permanent magnets, which are fixed to the rotor core. The stator may comprise a stator core, one or more insulators fixed to the stator core, and coils, which are respectively wound on teeth of the stator core via the insulator(s). A pole count, which indicates the number of the permanent magnets (more particularly, the number of permanent magnets that are disposed equispaced in a circumferential direction of the rotor core along a virtual circumscribed circle defined in a plane perpendicular to a rotational axis of the rotor core), may be eight; and a slot count, which indicates the number of the coils, may be six.

According to the above-mentioned configuration, by configuring the inner-rotor-type brushless motor used as the motive power source of the electric work machine as an 8-pole/6-slot brushless motor, the brushless motor can be made more compact.

In one or more embodiments, when the induced voltage [V] of the brushless motor is given as E and the rotational speed [krpm] of the brushless motor is given as ω, induced voltage constant k [V/krpm], which is expressed as E/ω, may preferably satisfy the condition below.

$$0.9 \leq k \leq 7.2$$

Throughout the present disclosure, the abbreviation "krpm" means "kilorevolutions per minute".

By configuring the 8-pole/6-slot brushless motor in this manner, the electric work machine can be made more compact.

In one or more embodiments, when the motor resistance [mΩ] of the brushless motor is given as R and the induced voltage constant of the brushless motor is given as k, coefficient α [mΩ/(V/krpm)$^2$], which is expressed as R/k$^2$, may preferably satisfy the condition below.

$$0.39 \leq \alpha \leq 24.69$$

By configuring the 8-pole/6-slot brushless motor in this manner, the electric work machine can be made more compact.

In one or more embodiments, when the induced voltage [V] of the brushless motor is given as E and the rotational speed [krpm] of the brushless motor is given as ω, induced voltage constant k [V/krpm], which is expressed as E/ω, may preferably satisfy the condition below.

$$1.44 \leq k \leq 7.2$$

By configuring the 8-pole/6-slot brushless motor in this manner, the electric work machine can be made more compact.

In one or more embodiments, when the motor resistance [mΩ] of the brushless motor is given as R and the induced voltage constant of the brushless motor is given as k, coefficient α[mΩ/(V/krpm)$^2$], which is expressed by R/k$^2$, may preferably satisfy the condition below.

$$0.39 \leq \alpha \leq 9.65$$

By configuring the 8-pole/6-slot brushless motor in this manner, the electric work machine can be made more compact.

In one or more embodiments, when the induced voltage [V] of the brushless motor is given as E and the rotational speed [krpm] of the brushless motor is given as ω, induced voltage constant k [V/krpm], which is expressed as E/ω, may preferably satisfy the condition below.

$$2.4 \leq k \leq 7.2$$

By configuring the 8-pole/6-slot brushless motor in this manner, the electric work machine can be made more compact.

In one or more embodiments, when the motor resistance [mΩ] of the brushless motor is given as R and the induced voltage constant of the brushless motor is given as k, coefficient α [mΩ/(V/krpm)$^2$], which is expressed as R/k$^2$, may preferably satisfy the condition below.

$$0.39 \leq \alpha \leq 3.47$$

By configuring the 8-pole/6-slot brushless motor in this manner, the electric work machine can be made more compact.

In one or more embodiments, stator outer diameter A [mm], which indicates the outer diameter of the stator core, may preferably satisfy the condition below.

$$45 \leq A \leq 70$$

By configuring the brushless motor in this manner, the electric work machine can be optimally configured.

In one or more embodiments, stator outer diameter A [mm], which indicates the outer diameter of the stator core, may preferably satisfy the condition below.

$$45 \leq A \leq 65$$

By configuring the brushless motor in this manner, the electric work machine can be optimally configured.

In one or more embodiments, stator outer diameter A [mm], which indicates the outer diameter of the stator core, may preferably satisfy the condition below.

$$45 \leq A \leq 60$$

By configuring the brushless motor in this manner, the electric work machine can be optimally configured.

In one or more embodiments, when the stator outer diameter, which indicates the outer diameter of the stator core, is given as A [mm], and the rotor outer diameter, which indicates the outer diameter of the rotor core, is given as G [mm], the condition below preferably may be satisfied.

$$0.5 \times A \leq G \leq 0.65 \times A$$

By configuring the brushless motor in this manner, the electric work machine can be optimally configured.

In one or more embodiments, when the stator outer diameter, which indicates the outer diameter of the stator core, is given as A [mm], and the tooth width, which indicates the dimension of each of the teeth in a circumferential direction, is given as C [mm], the condition below preferably may be satisfied.

$$0.06 \times A \leq C \leq 0.114 \times A$$

By configuring the brushless motor in this manner, the electric work machine can be optimally configured.

In one or more embodiments, when the back-yoke width, which indicates the dimension of the yoke of the stator core in a radial direction, is given as D [mm], the condition below preferably may be satisfied.

$$0.5 \times C \leq D \leq 0.5 \times C + 2$$

By configuring the brushless motor in this manner, the electric work machine can be optimally configured.

In one or more embodiments, when the magnet thickness, which indicates the dimension of the permanent magnet in the radial direction, is given as H [mm], the condition below preferably may be satisfied.

$$2.0 \leq H \leq 4.0$$

By configuring the brushless motor in this manner, the electric work machine can be optimally configured.

In one or more embodiments, when the dimension of an air gap, which indicates the gap between the stator core and the rotor core in the radial direction, is given as J [mm], the condition below preferably may be satisfied.

$$0.4 \leq J \leq 0.6$$

By configuring the brushless motor in this manner, the electric work machine can be optimally configured.

In one or more embodiments, when the axial length of the stator core, i.e. the dimension of the stator core in an axial direction, is given as K [mm], the condition below may be satisfied.

$$K \leq 50$$

Here, it is noted that the length of the stator core in the axial direction may be obtained by multiplying the number of laminations of steel sheets that form the stator core by the thickness of a (one) steel sheet.

By configuring the brushless motor in this manner, the electric work machine can be optimally configured.

In one or more embodiments, when the axial length of the rotor core, i.e. the dimension of the rotor core in the axial direction, is given as L [mm], the condition below preferably may be satisfied.

$$K \leq L \leq K + 10$$

Here, it is noted that the length of the rotor core in the axial direction may be obtained by multiplying the number of laminations of steel sheets that form the rotor core by the thickness of a (one) steel sheet.

By configuring the brushless motor in this manner, the electric work machine can be optimally configured.

In one or more embodiments, the electric work machine may comprise one or more magnetic sensors, which detect(s) the rotation of the rotor.

According to the above-mentioned configuration, even when the electric work machine performs work under a heavy load, the motor can be smoothly driven.

In one or more embodiments, the six coils may be delta connected.

According to the above-mentioned configuration, the thickness of the wire that forms the coils need not be increased.

Embodiments according to the present disclosure will be explained in detail below, with reference to the drawings, but the present disclosure is not limited to such embodiments. Structural elements of the embodiments explained below can be combined where appropriate. In addition, there are also embodiments in which some of the structural elements need not be used.

In the embodiments, positional relationships among the various parts are explained using the terms "left," "right," "front," "rear," "up," and "down." These terms indicate relative position or direction, with the center of the electric work machine as a reference.

The electric work machine comprises the motor. In the embodiments, a direction parallel to rotational axis AX of the motor is called an axial direction where appropriate. A radial direction of rotational axis AX of the motor is called a radial direction where appropriate. A direction that goes around rotational axis AX of the motor is called a circumferential direction or a rotational direction where appropriate. A direction parallel to a tangent of a virtual circle that is centered on rotational axis AX of the motor is called a tangential direction where appropriate.

In the radial direction, a location that is proximate to or a direction that approaches rotational axis AX of the motor is called inward in the radial direction where appropriate, and a location that is distant from or a direction that leads away from rotational axis AX of the motor is called outward in the radial direction where appropriate. A location on one side or a direction on one side of the circumferential direction is called one side in the circumferential direction where appropriate, and a location on the other side or a direction on the other side of the circumferential direction is called the other side in the circumferential direction where appropriate. A location on one side or a direction on one side of the tangential direction is called one side in the tangential direction where appropriate, and a location on the other side or a direction on the other side of the tangential direction is called the other side in the tangential direction where appropriate.

Electric Work Machine

FIG. 1 is an oblique view that shows an electric work machine 1 according to one representative, non-limiting embodiment of the present teachings. In this embodiment, the electric work machine 1 is a chain saw, which is one type of horticulture tool (outdoor power equipment or "OPE") that falls within the general category of power tools.

The electric work machine 1 comprises a housing 2, a front-grip part 3, a hand guard 4, battery-mounting parts 5, a motor 6, a trigger switch 7, a trigger-lock lever 8, a guide bar 9, a saw chain 10, and a controller 11.

The housing 2 is formed of a synthetic resin (polymer). The housing 2 comprises a motor-housing part 2A, a battery-holding part 2B, and a rear-grip part 2C.

The motor-housing part 2A houses the motor 6. The battery-holding part 2B is connected to a rear portion of the motor-housing part 2A. The battery-mounting parts 5 are disposed on the battery-holding part 2B. The battery-holding part 2B houses the controller 11. The rear-grip part 2C is connected to a rear portion of the battery-holding part 2B.

The front-grip part 3 is formed of a synthetic resin (polymer). The front-grip part 3 is a pipe-shaped member. The front-grip part 3 is connected to the battery-holding part 2B. One-end portion and an other-end portion of the front-grip part 3 are each connected to a surface of the battery-holding part 2B. A user can perform work using the electric work machine 1 in the state in which the user grips the front-grip part 3 and the rear-grip part 2C with their hands.

The hand guard 4 is disposed forward of the front-grip part 3. The hand guard 4 is fixed to the motor-housing part 2A. The hand guard 4 protects the user's hand that grips the front-grip part 3.

Battery packs 12 are mounted on the battery-mounting parts 5. The battery packs 12 are detachable from the battery-mounting parts 5. The battery packs 12 comprise secondary (rechargeable) batteries. In the embodiment, the battery packs 12 comprise rechargeable lithium-ion battery cells. By being mounted on the battery-mounting parts 5, the battery packs 12 can supply electric power (current) to the electric work machine 1. The motor 6 operates (is energized or driven) using electric power supplied from the battery packs 12. The controller 11 operates (is energized or powered) using electric power supplied from the battery packs 12.

The motor 6 is the motive power source (prime mover) of the electric work machine 1. The motor 6 generates a rotational force for circulating the saw chain 10 around the guide bar 9. The motor 6 is a brushless electric motor.

The trigger switch 7 is manipulated (pressed) by the user to operate (energize) the motor 6. The trigger switch 7 is provided on the rear-grip part 2C. In response to the trigger switch 7 being manipulated such that it moves upward, the motor 6 operates. In response to the manipulation of the trigger switch 7 being released, energization of the motor 6 stops.

The trigger-lock lever 8 is disposed on the rear-grip part 2C. In response to the trigger-lock lever 8 being manipulated (pressed), manipulation of the trigger switch 7 is permitted.

The guide bar 9 is supported by the housing 2. The guide bar 9 is a plate-shaped member. The saw chain 10 comprises a plurality of cutters (drive links) coupled to each other. The saw chain 10 is disposed on (around) a peripheral-edge portion of the guide bar 9. When the trigger switch 7 is manipulated, the motor 6 operates. The motor 6 and the saw chain 10 are coupled via a power-transmission mechanism (not shown), which comprises a sprocket. In response to the operation (energization) of the motor 6, rotation of the sprocket causes the saw chain 10 to move along the peripheral-edge portion of the guide bar 9.

Electric Motor

Figure 2:
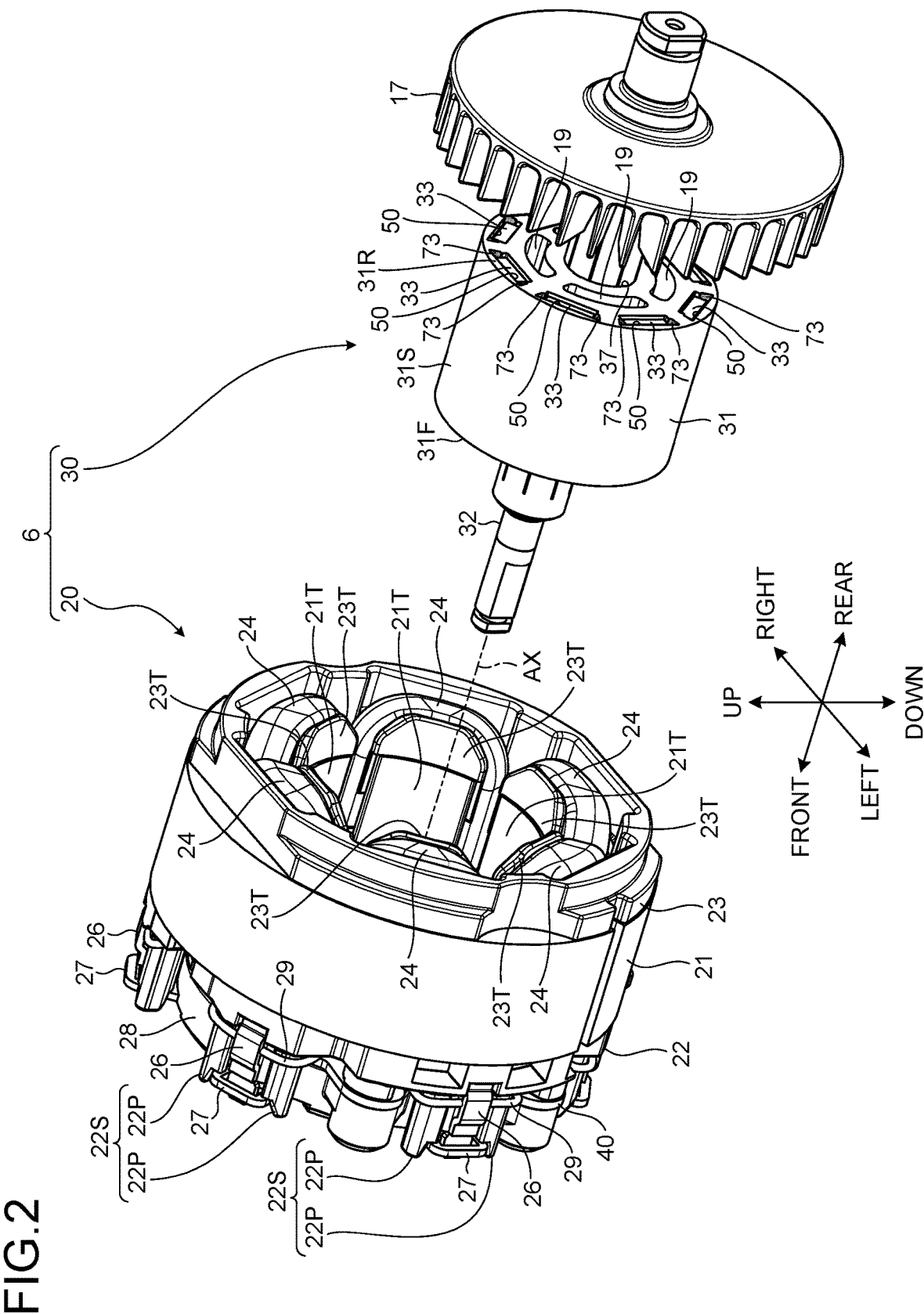
FIG. 2 is an exploded, oblique view, viewed from the rear, that shows a motor according to the embodiment.
Figure 3:
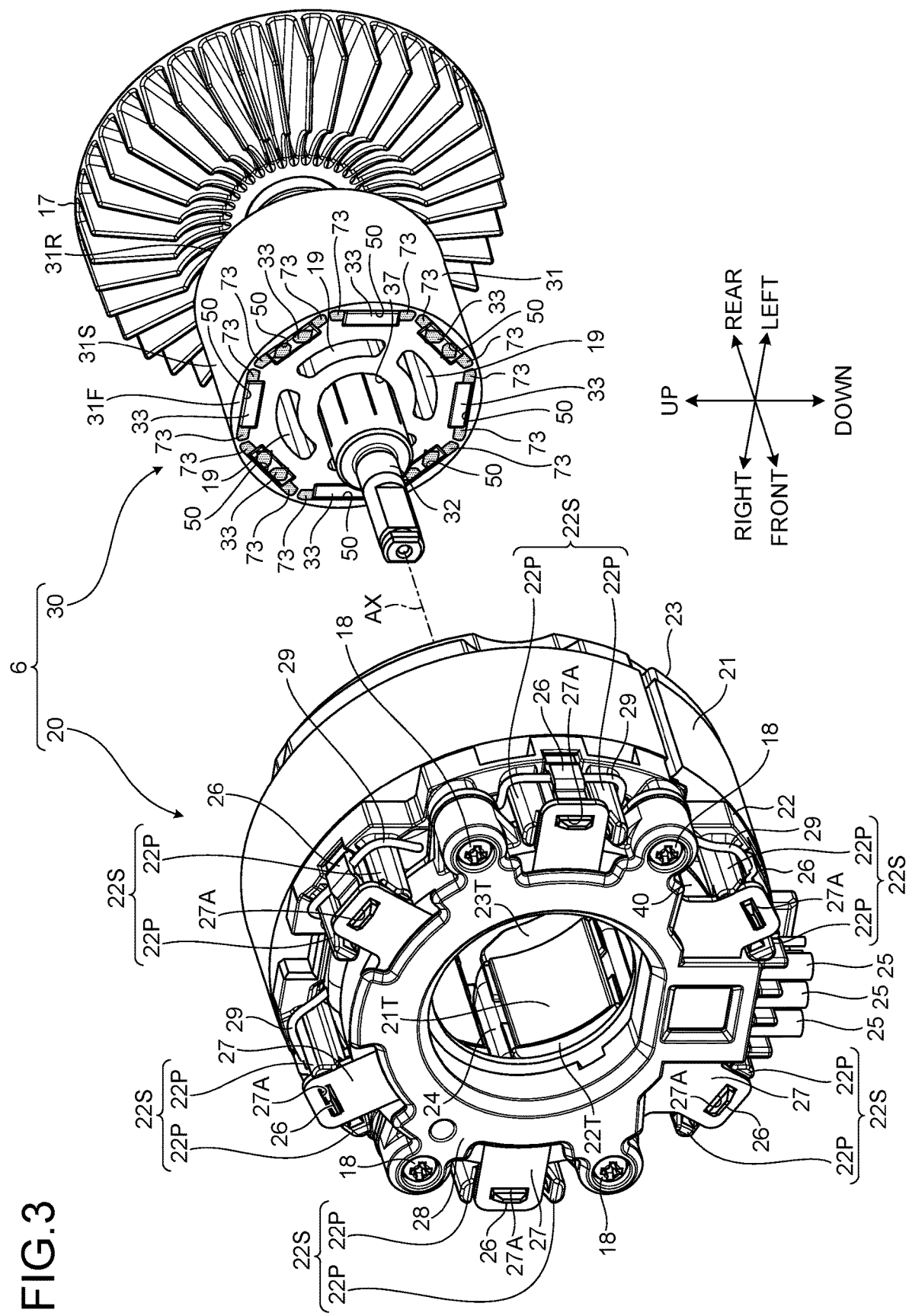
FIG. 3 is an exploded, oblique view, viewed from the front, that shows the motor according to the embodiment.
Figure 4:
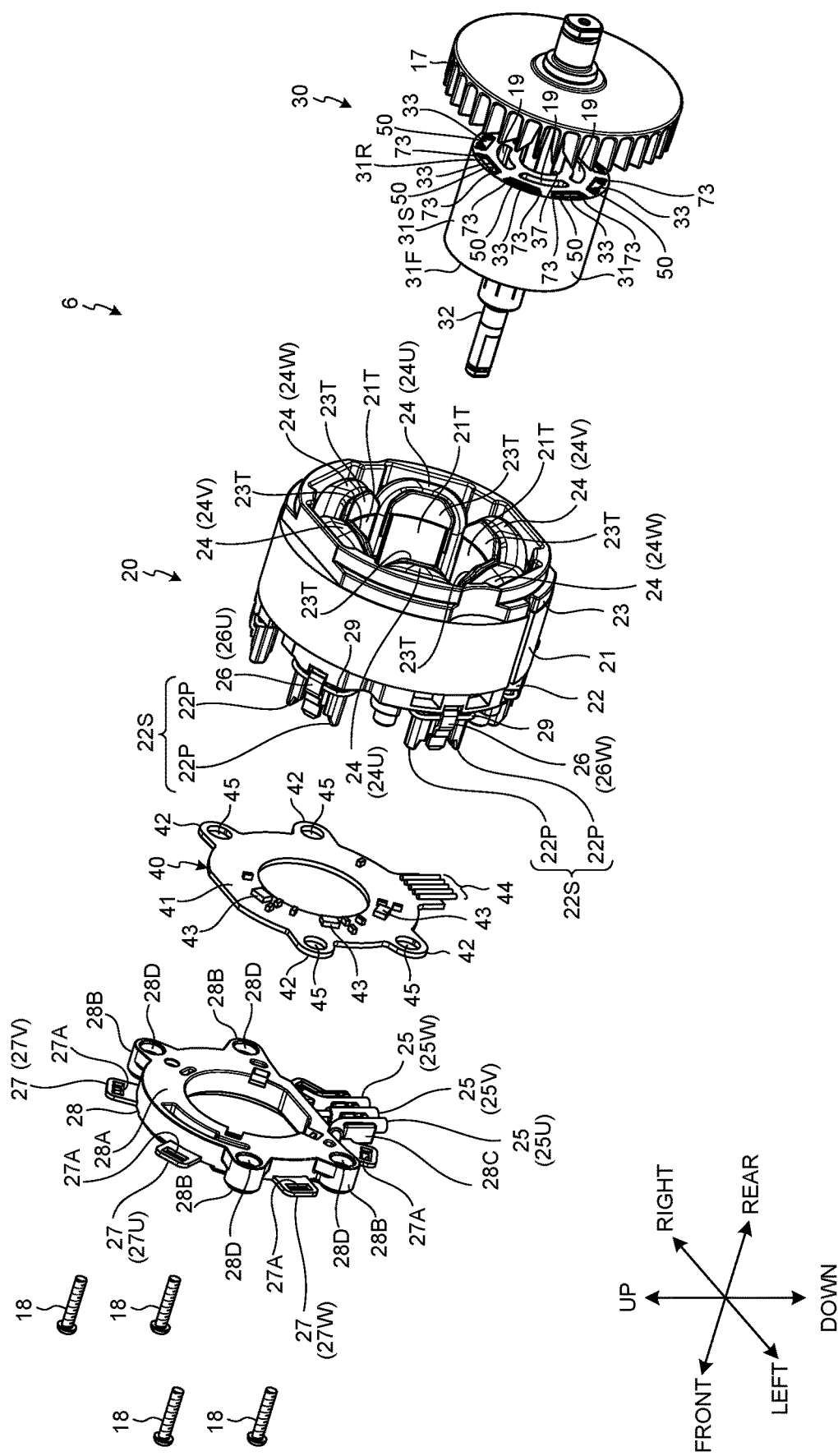
FIG. 4 is an exploded, oblique view, viewed from the rear, that shows a stator and a rotor according to the embodiment.
Figure 5:
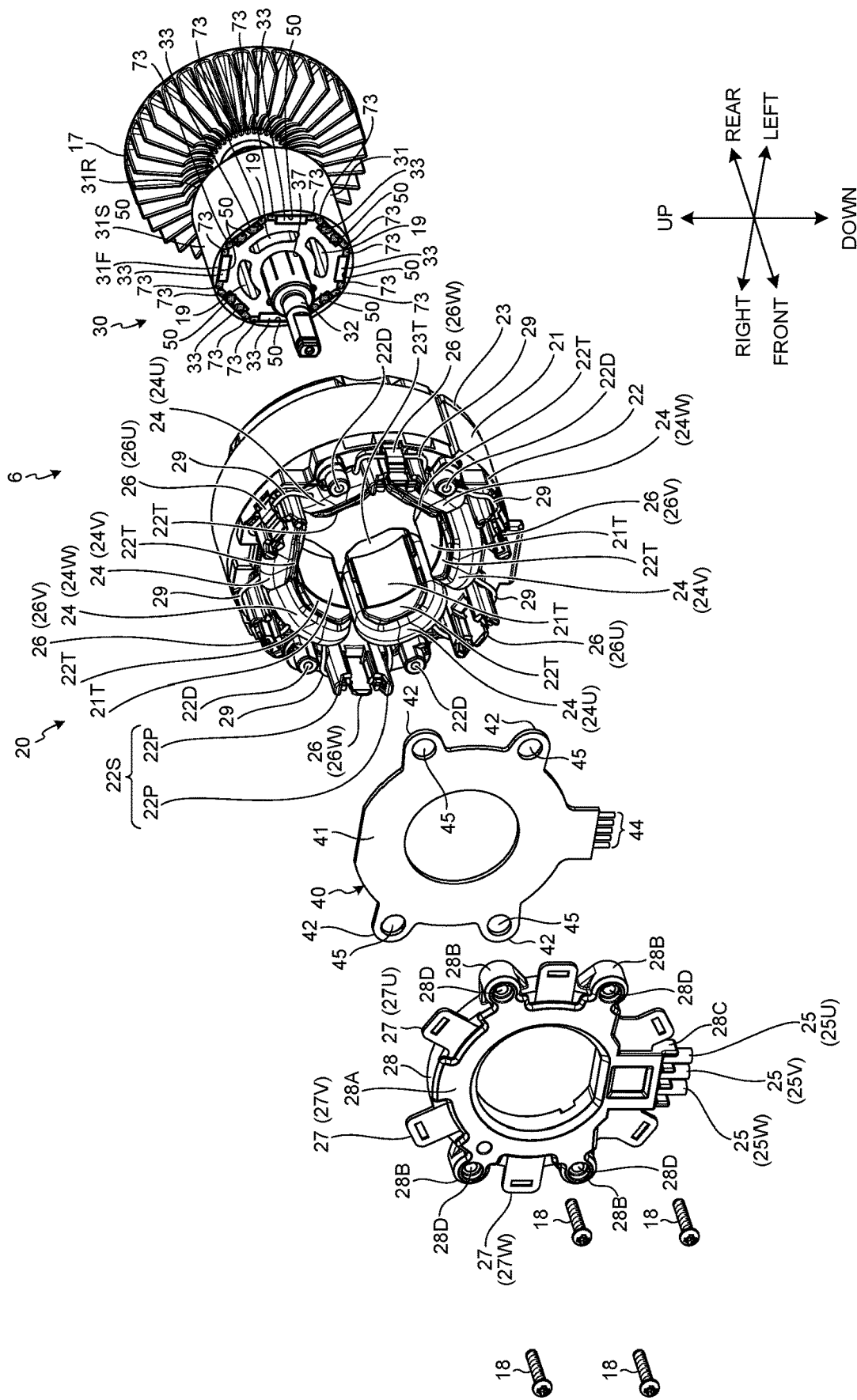
FIG. 5 is an exploded, oblique view, viewed from the front, that shows the stator and the rotor according to the embodiment.

FIG. 2 is an exploded, oblique view, viewed from the rear, that shows the motor 6 according to the embodiment. FIG. 3 is an exploded, oblique view, viewed from the front, that shows the motor 6 according to the embodiment. FIG. 4 is an exploded, oblique view, viewed from the rear, that shows a stator 20 and a rotor 30 according to the embodiment. FIG. 5 is an exploded, oblique view, viewed from the front, that shows the stator 20 and the rotor 30 according to the embodiment.

In the embodiment, the motor 6 is an inner-rotor-type brushless motor. As shown in FIGS. 2-5, the motor 6 comprises the stator 20 and the rotor 30, which rotates relative to the stator 20. The stator 20 is disposed around the rotor 30. The rotor 30 rotates about rotational axis AX.

Stator

The stator 20 comprises a stator core 21, a front insulator 22, a rear insulator 23, coils 24, power-supply lines 25, fusing terminals 26, short-circuiting members 27, and an insulating member 28. The front insulator 22 and the rear insulator 23 may be fixed to the stator core 21 by integral molding (insert molding).

The stator core 21 comprises a plurality of laminated steel sheets. Each of the steel sheets is a sheet made of a metal in which iron is the main component. The stator core 21 has a tube shape. The stator core 21 comprises teeth 21T, which respectively support the coils 24. The teeth 21T protrude inward in the radial direction from an inner surface of the stator core 21. In the embodiment, six of the teeth 21T are provided. As noted above, the axial length of the stator core 21 may be calculated by multiplying the number of laminated steel sheets by the thickness of one steel sheet in the axial direction.

The front insulator 22 is an electrically insulating member that is made of a synthetic resin (polymer). The front insulator 22 is fixed to a front portion of the stator core 21. The front insulator 22 has a tube shape. The front insulator 22 comprises protruding parts 22T, which respectively support the coils 24. The protruding parts 22T protrude inward in the radial direction from an inner surface of the front insulator 22. In the embodiment, six of the protruding parts 22T are provided.

The rear insulator 23 is an electrically insulating member that is made of a synthetic resin (polymer). The rear insulator 23 is fixed to a rear portion of the stator core 21. The rear insulator 23 has a tube shape. The rear insulator 23 comprises protruding parts 23T, which respectively support the coils 24. The protruding parts 23T protrude inward in the radial direction from an inner surface of the rear insulator 23. In the embodiment, six of the protruding parts 23T are provided.

Front-end portions of the teeth 21T and rear-end portions of the protruding parts 22T are connected. Rear-end portions of the teeth 21T and front-end portions of the protruding parts 23T are connected.

The coils 24 are wound via the front insulator 22 and the rear insulator 23 and around the teeth 21T of the stator core 21. A plurality of the coils 24 is provided. In the embodiment, six of the coils 24 are provided. The coils 24 are respectively wound on the teeth 21T via the protruding parts 22T and the protruding parts 23T. The coils 24 are disposed around the teeth 21T, the protruding parts 22T, and the protruding parts 23T. The coils 24 and the stator core 21 are insulated from each other by the front insulator 22 and the rear insulator 23.

The plurality of coils 24 is formed by winding a single, continuous (unbroken) wire. The coils 24 that are adjacent to each other in the circumferential direction are each electrically connected by a respective connection wire 29, which is a portion of the single, continuous wire. Thus, each of the connection wires 29 is a wire (wire portion) between one of the coils 24 and another one of the coils 24. The connection wires 29 are supported by (on) the front insulator 22.

The power-supply lines 25 are electrically connected to the battery packs 12 via the controller 11. The battery packs 12 function as the electrical power supply unit of the motor 6. The battery packs 12 supply drive currents to the motor 6 via the controller 11. The controller 11 controls the drive currents supplied from the battery packs 12 to the motor 6.

The drive currents from the battery packs 12 are supplied to the power-supply lines 25 via the controller 11.

The fusing terminals 26 are connected to the coils 24 via the connection wires 29. The fusing terminals 26 are electrically conductive members. A plurality of the fusing terminals 26 is disposed around rotational axis AX. The number of the fusing terminals 26 provided is the same as the number of the coils 24. In the embodiment, six of the fusing terminals 26 are provided.

The fusing terminals 26 are supported by the front insulator 22. In the embodiment, the front insulator 22 comprises support parts 22S, which respectively support the fusing terminals 26. Six of the support parts 22S are provided such that they are spaced apart in the circumferential direction. Each of the support parts 22S comprises a pair of protruding parts 22P, which protrudes forward from a front surface of the front insulator 22. When each of the fusing terminals 26 are disposed between a pair of the protruding parts 22P, the support parts 22S are supported.

The connection wires 29 are supported by the support parts 22S. The connection wires 29 are supported by outer surfaces of the protruding parts 22P outward in the radial direction. When each of the fusing terminals 26 is disposed between a pair of the protruding parts 22P, the fusing terminals 26 are connected to the connection wires 29. Each of the connection wires 29 is respectively disposed in the interior of a bent portion of the corresponding fusing terminal 26. The fusing terminals 26 and the connection wires 29 are welded together. When the fusing terminals 26 and the connection wires 29 are welded together, the fusing terminals 26 are physically and electrically connected to the connection wires 29.

The short-circuiting members 27 respectively connect the fusing terminals 26 to the power-supply lines 25. The short-circuiting members 27 are electrically conductive members. Within a plane orthogonal to rotational axis AX, the short-circuiting members 27 are curved. A plurality of the short-circuiting members 27 is provided. In the embodiment, three of the short-circuiting members 27 are provided. Each of the short-circuiting members 27 electrically connects (short circuits) one of the power-supply lines 25 to one pair of the fusing terminals 26. Each of the short-circuiting members 27 has an opening 27A, in which a front portion of the corresponding fusing terminal 26 is disposed. When the front portion of the fusing terminal 26 is disposed in the opening 27A, the fusing terminal 26 and the short-circuiting member 27 are physically and electrically connected.

The insulating member 28 supports the power-supply lines 25 and the short-circuiting members 27. The insulating member 28 is made of a synthetic resin (polymer). The insulating member 28 comprises a body part 28A, screw-boss parts 28B, and a support part 28C.

The body part 28A has a ring shape. In the embodiment, at least a portion of each of the short-circuiting members 27 is disposed in the interior of the body part 28A. Each of the short-circuiting members 27 is fixed to the body part 28A by insert molding. The fusing terminals 26 are supported by the body part 28A via the short-circuiting members 27. The three short-circuiting members 27 are insulated from each other by the body part 28A.

The screw-boss parts 28B protrude outward in the radial direction from circumferential-edge portions of the body part 28A. Four of the screw-boss parts 28B are provided at the circumferential-edge portions of the body part 28A.

The support part 28C protrudes downward from a lower portion of the body part 28A. The support part 28C supports the power-supply lines 25.

The power-supply lines 25, the fusing terminals 26, the short-circuiting members 27, and the insulating member 28 are disposed forward of the stator core 21. At least a portion of each of the fusing terminals 26 is disposed rearward of the corresponding short-circuiting member 27 and the insulating member 28.

Figure 6:
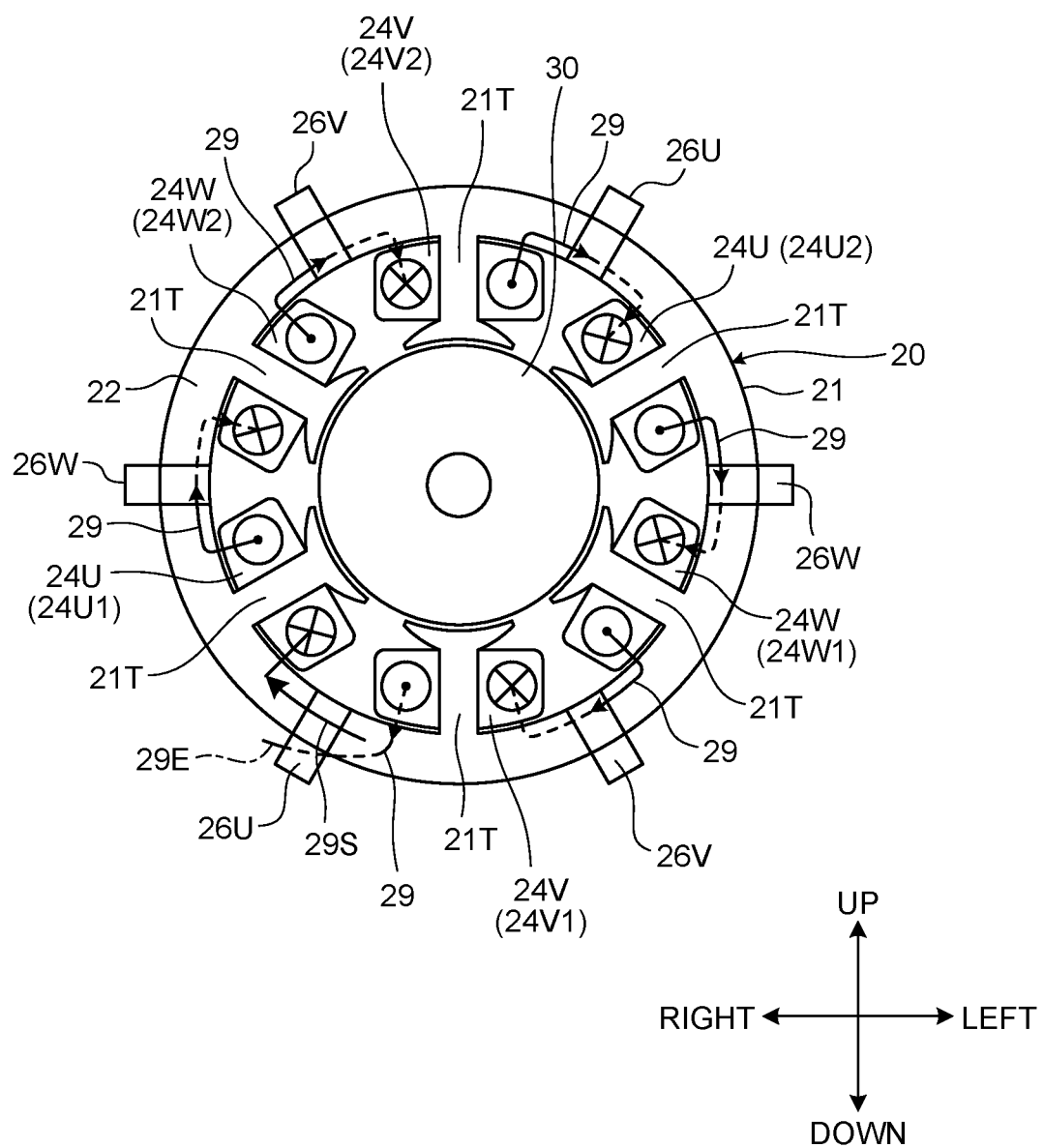
FIG. 6 schematically shows the stator according to the embodiment.
Figure 7:
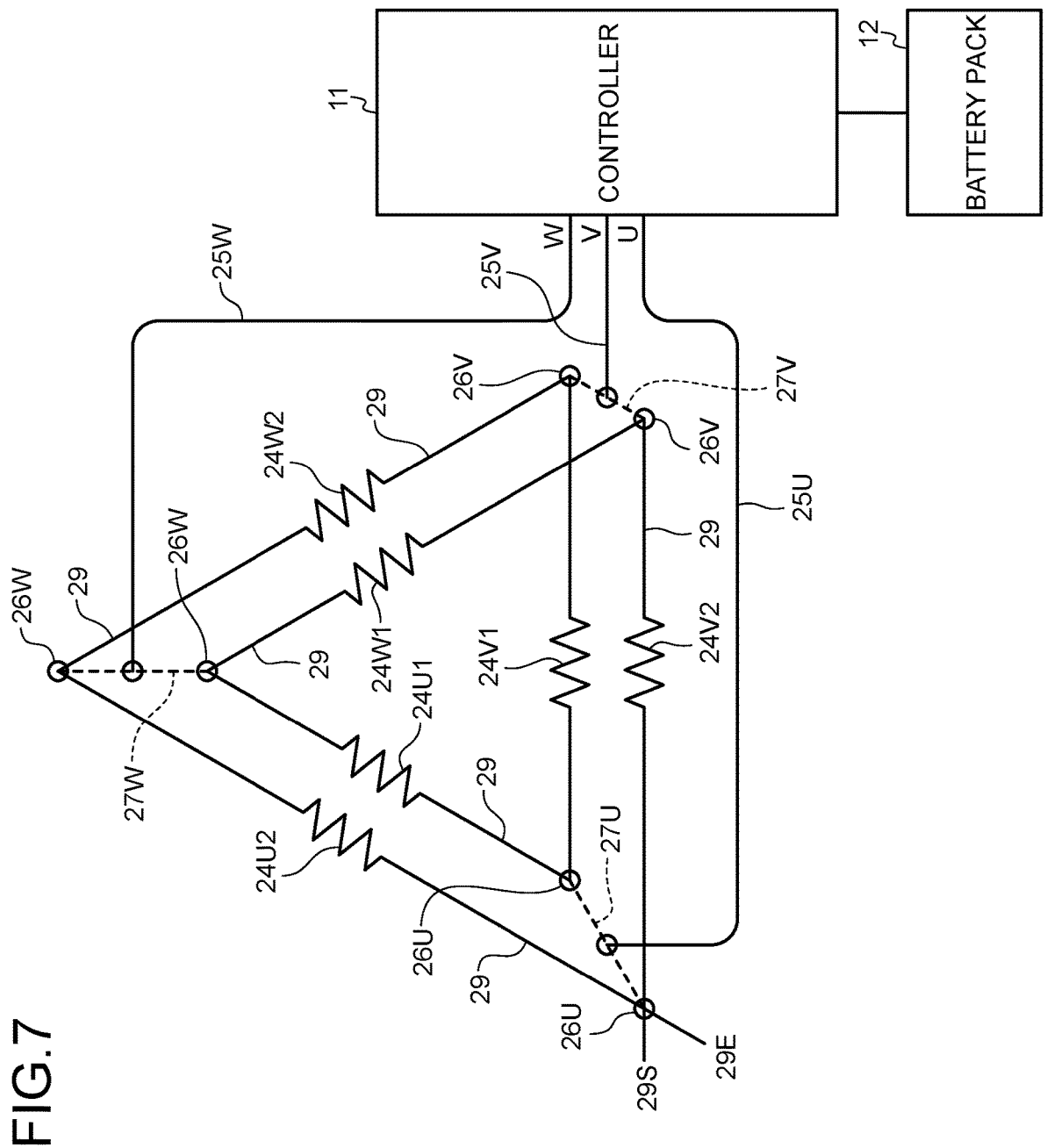
FIG. 7 schematically shows the wiring state of coils according to the embodiment.

FIG. 6 schematically shows the stator 20 according to the embodiment. FIG. 7 schematically shows the wiring state of the coils 24 according to the embodiment.

In the embodiment, the six coils 24 are formed by winding one single (continuous) wire, as was noted above. As shown in FIGS. 6 and 7, the wire is wound around the teeth 21T starting from a winding-start portion 29S. The wire is successively wound around the teeth 21T that are adjacent to each other in the circumferential direction, and thereby the six coils 24 are formed. The winding of the wire ends at a winding-end portion 29E.

As shown in FIG. 7, the battery packs 12 supply drive currents to the power-supply lines 25 via the controller 11. The drive currents supplied to the power-supply lines 25 are supplied to the fusing terminals 26 via the short-circuiting members 27. The drive currents supplied to the fusing terminals 26 are supplied to the coils 24 via the connection wires 29.

In the embodiment, the drive currents include a U-phase drive current, a V-phase drive current, and a W-phase drive current.

As shown in FIGS. 4-7, the power-supply lines 25 comprise: a U-phase power-supply line 25U, to which the U-phase drive current is supplied; a V-phase power-supply line 25V, to which the V-phase drive current is supplied; and a W-phase power-supply line 25W, to which the W-phase drive current is supplied.

The short-circuiting members 27 comprise: a U-phase short-circuiting member 27U, which is connected to the U-phase power-supply line 25U; a V-phase short-circuiting member 27V, which is connected to the V-phase power-supply line 25V; and a W-phase short-circuiting member 27W, which is connected to the W-phase power-supply line 25W.

The fusing terminals 26 comprise: a pair of U-phase fusing terminals 26U connected to the U-phase short-circuiting member 27U; a pair of V-phase fusing terminals 26V connected to the V-phase short-circuiting member 27V; and a pair of W-phase fusing terminals 26W connected to the W-phase short-circuiting member 27W.

Each of the six coils 24 is allocated to one of the phases, namely: the U (U-V) phase, the V (V-W) phase, or the W (W-U) phase.

Each of the three pairs of coils 24 is allocated to one of the U phase, the V phase, or the W phase. The six coils 24 comprise: a pair of U-phase coils 24U allocated to the U phase; a pair of V-phase coils 24V allocated to the V phase; and a pair of W-phase coils 24W allocated to the W phase.

The pair of U-phase coils 24U is disposed such that the U-phase coils 24U oppose each other in the radial direction. The pair of V-phase coils 24V is disposed such that the V-phase coils 24V oppose each other in the radial direction. The pair of W-phase coils 24W is disposed such that the W-phase coils 24W oppose each other in the radial direction. As shown in FIG. 6, in the circumferential direction, a V-phase coil 24V1 is disposed adjacent to a U-phase coil 24U1, a W-phase coil 24W1 is disposed adjacent to the V-phase coil 24V1, a U-phase coil 24U2 is disposed adjacent to the W-phase coil 24W1, a V-phase coil 24V2 is disposed adjacent to the U-phase coil 24U2, and a W-phase coil 24W2 is disposed adjacent to the V-phase coil 24V2. The U-phase coil 24U1 and the U-phase coil 24U2 are disposed such that they oppose each other in the radial direction. The V-phase coil 24V1 and the V-phase coil 24V2 are disposed such that they oppose each other in the radial direction. The W-phase coil 24W1 and the W-phase coil 24W2 are disposed such that they oppose each other in the radial direction.

As shown in FIG. 6, one of the U-phase fusing terminals 26U is connected to the connection wire 29 that connects the U-phase coil 24U1 and the V-phase coil 24V1, which are adjacent to each other in the circumferential direction. The other U-phase fusing terminal 26U is connected to the connection wire 29 that connects the U-phase coil 24U2 and the V-phase coil 24V2, which are adjacent to each other in the circumferential direction. One of the V-phase fusing terminals 26V is connected to the connection wire 29 that connects the V-phase coil 24V1 and the W-phase coil 24W1, which are adjacent to each other in the circumferential direction. The other V-phase fusing terminal 26V is connected to the connection wire 29 that connects the V-phase coil 24V2 and the W-phase coil 24W2, which are adjacent to each other in the circumferential direction. One of the—phase fusing terminals 26W is connected to the connection wire 29 that connects the W-phase coil 24W1 and the U-phase coil 24U2, which are adjacent to each other in the circumferential direction. The other W-phase fusing terminal 26W is connected to the connection wire 29 that connects the W-phase coil 24W2 and the U-phase coil 24U1, which are adjacent to each other in the circumferential direction.

The U-phase short-circuiting member 27U electrically connects (short circuits) the U-phase power-supply line 25U to each of the U-phase fusing terminals 26U of the pair of U-phase fusing terminals 26U. More specifically, the U-phase power-supply line 25U is electrically connected to (e.g., to an intermediate portion of) the U-phase short-circuiting member 27U. One of the U-phase fusing terminals 26U is disposed at and electrically connected to one-end portion of the U-phase short-circuiting member 27U. The other U-phase fusing terminal 26U is disposed at and electrically connected to the other-end portion of the U-phase short-circuiting member 27U.

The V-phase short-circuiting member 27V electrically connects (short circuits) the V-phase power-supply line 25V to the pair of V-phase fusing terminals 26V. More specifically, the V-phase power-supply line 25V is electrically connected to (e.g., to an intermediate portion of) the V-phase short-circuiting member 27V. One of the V-phase fusing terminals 26V is disposed at and electrically connected to one-end portion of the V-phase short-circuiting member 27V. The other V-phase fusing terminal 26V is disposed at and electrically connected to the other-end portion of the V-phase short-circuiting member 27V.

The W-phase short-circuiting member 27W connects (short circuits) the W-phase power-supply line 25W to the pair of W-phase fusing terminals 26W. More specifically, the W-phase power-supply line 25W is electrically connected to (e.g., an intermediate portion of) the W-phase short-circuiting member 27W. One of the W-phase fusing terminals 26W is disposed at and electrically connected to one-end portion of the W-phase short-circuiting member 27W. The other W-phase fusing terminal 26W is disposed at and electrically connected to the other-end portion of the W-phase short-circuiting member 27W.

As shown in FIG. 7, the U-phase coil 24U1, the V-phase coil 24V1, and the W-phase coil 24W1, which constitute one group, are delta connected. The U-phase coil 24U2, the V-phase coil 24V2, and the W-phase coil 24W2, which constitute one (another) group, are delta connected. The one delta connection and the other delta connection are disposed in parallel. In the embodiment, the six coils 24 are delta connected in a 1S2P configuration.

When the U-phase drive current is input to the U-phase power-supply line 25U, the U-phase drive current is supplied to the pair of U-phase fusing terminals 26U via the U-phase short-circuiting member 27U. When the U-phase coil 24U1, which is one of the U-phase coils 24U among the pair of U-phase coils 24U, is excited to the N pole, the U-phase coil 24U2, which is the other U-phase coil 24U from among the pair of U-phase coils 24U, is excited to the S pole. The V-phase coil 24V1, which is adjacent to the U-phase coil 24U1 excited to the N pole, is excited to the S pole, and the V-phase coil 24V2, which is adjacent to the U-phase coil 24U2 excited to the S pole, is excited to the N pole.

When the V-phase drive current is input to the V-phase power-supply line 25V, the V-phase drive current is supplied to the pair of V-phase fusing terminals 26V via the V-phase short-circuiting member 27V. When the V-phase coil 24V1, which is one of the V-phase coils 24V among the pair of V-phase coils 24V, is excited to the N pole, the V-phase coil 24V2, which is the other V-phase coil 24V from among the pair of V-phase coils 24V, is excited to the S pole. The W-phase coil 24W1, which is adjacent to the V-phase coil 24V1 excited to the N pole, is excited to the S pole, and the W-phase coil 24W2, which is adjacent to the V-phase coil 24V2 excited to the S pole, is excited to the N pole.

When the W-phase drive current is input to the W-phase power-supply line 25W, the W-phase drive current is supplied to the pair of W-phase fusing terminals 26W via the W-phase short-circuiting member 27W. When the W-phase coil 24W1, which is one of the W-phase coils 24W from among the pair of W-phase coils 24W, is excited to the N pole, the W-phase coil 24W2, which is the other W-phase coil 24W from among the pair of W-phase coils 24W, is excited to the S pole. The U-phase coil 24U1, which is adjacent to the W-phase coil 24W1 excited to the N pole, is excited to the S pole, and the U-phase coil 24U2, which is adjacent to the W-phase coil 24W2 excited to the S pole, is excited to the N pole.

Sensor Board

Referring back to FIGS. 4 and 5, the electric work machine 1 comprises a sensor board 40, which comprises magnetic sensors 43 that detect the rotation of the rotor 30. A Hall-effect sensor is an illustrative example of the magnetic sensors 43. The sensor board 40 is disposed forward of the front insulator 22. The sensor board 40 is disposed such that it opposes (faces) the front insulator 22. The sensor board 40 comprises a plate part 41, screw-boss parts 42, the magnetic sensors 43, and signal lines 44.

The plate part 41 has a ring shape. The screw-boss parts 42 protrude outward in the radial direction from circumferential-edge portions of the plate part 41. Four of the screw-boss parts 42 are provided at the circumferential-edge portions of the plate part 41.

The magnetic sensors 43 detect the rotation of the rotor 30. The magnetic sensors 43 are supported by the plate part 41. The magnetic sensors 43 comprise Hall-effect devices. Three of the magnetic sensors 43 are provided.

Detection signals of the magnetic sensors 43 are output to the controller 11 via the signal lines 44. The controller 11 supplies the drive currents to the plurality of coils 24 based on the detection signals of the magnetic sensors 43.

Fixing of Insulating Member, Sensor Board, and Front Insulator

The insulating member 28, which supports the short-circuiting members 27, the sensor board 40, and the front insulator 22 are fixed by four screws 18. The insulating member 28, the sensor board 40, and the front insulator 22 are fixed by the screws 18 such that the location of the signal lines 44 and the location of at least a portion of the power-supply lines 25 in the circumferential direction coincide.

Openings 28D, in which intermediate portions of the screws 18 are disposed, are provided in the screw-boss parts 28B of the insulating member 28. Openings 45, in which intermediate portions of the screws 18 are disposed, are provided in the screw-boss parts 42 of the sensor board 40. Four screw holes 22D are provided in a front surface of the front insulator 22. In the state in which the intermediate portions of the screws 18 are disposed in the openings 28D and the openings 45, tip portions of the screws 18 are coupled into the screw holes 22D. Thereby, the insulating member 28, the sensor board 40, and the front insulator 22 are fixed by the screws 18.

Rotor

Figure 8:
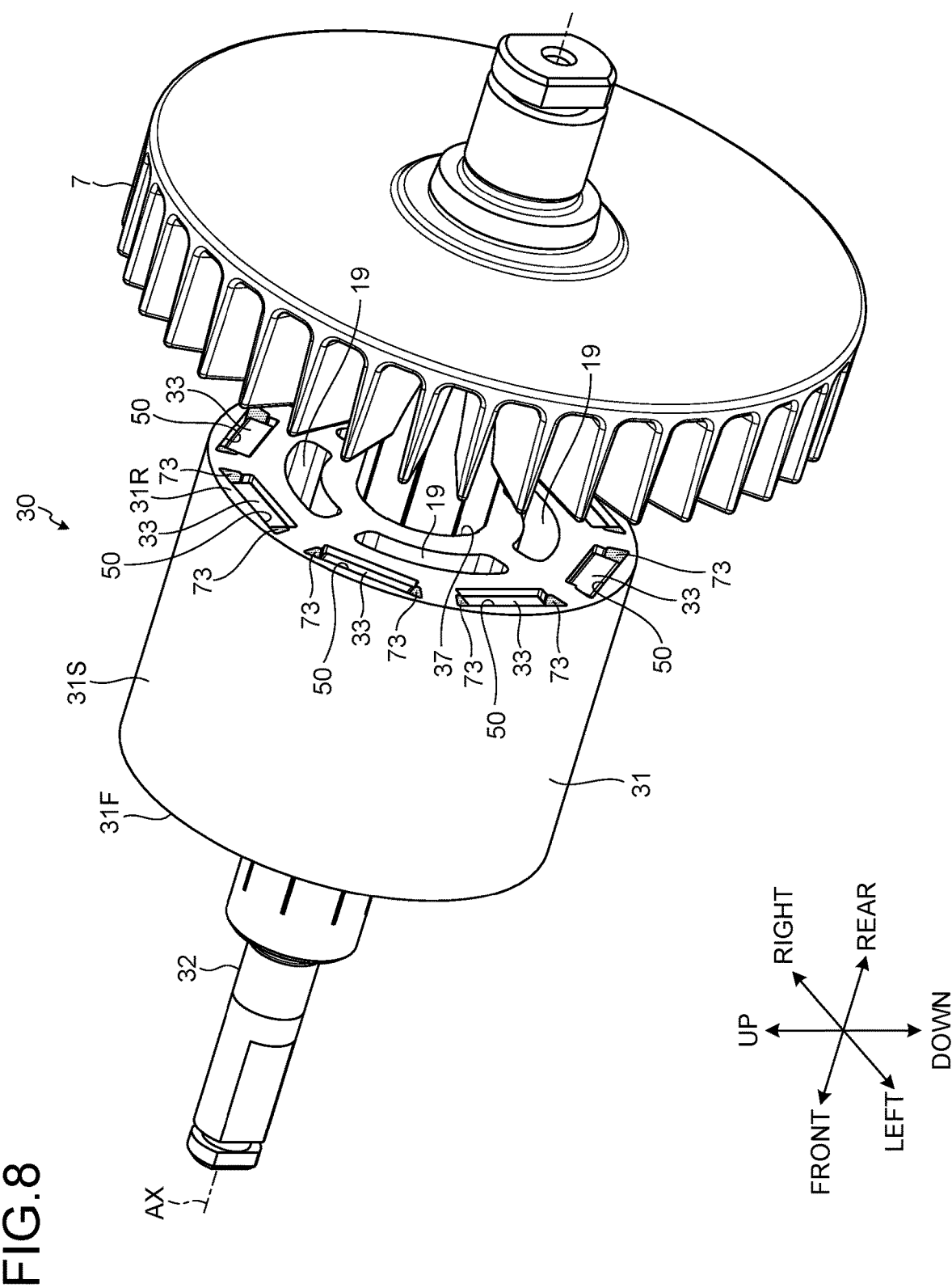
FIG. 8 is an oblique view, viewed from the rear, that shows the rotor according to the embodiment.
Figure 9:
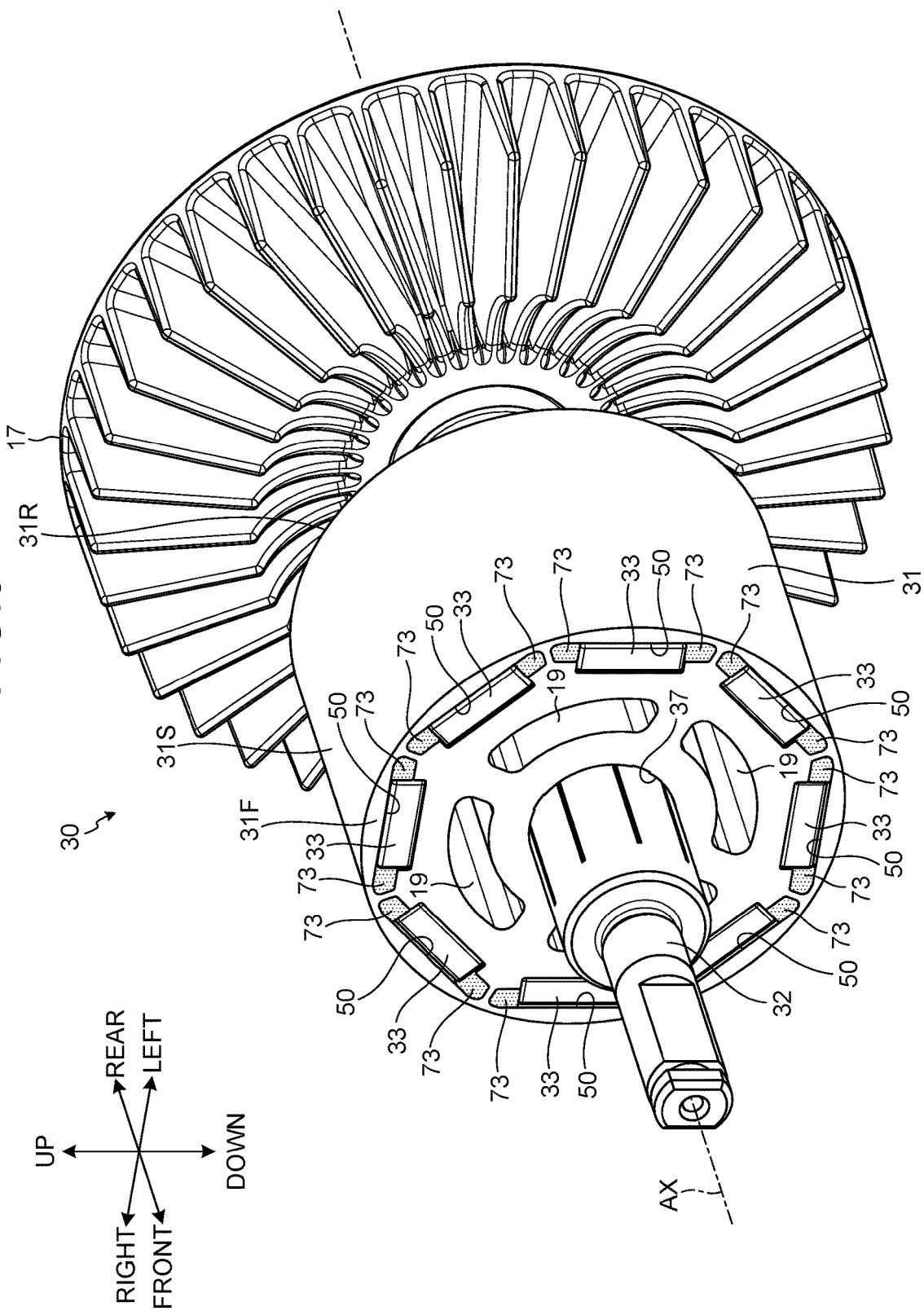
FIG. 9 is an oblique view, viewed from the front, that shows the rotor according to the embodiment.

FIG. 8 is an oblique view, viewed from the rear, that shows the rotor 30 according to the embodiment. FIG. 9 is an oblique view, viewed from the front, that shows the rotor 30 according to the embodiment.

As shown in FIGS. 8 and 9, the rotor 30 comprises a rotor core 31, a rotor shaft 32, and permanent magnets 33. The rotor 30 rotates about rotational axis AX.

Figure 10:
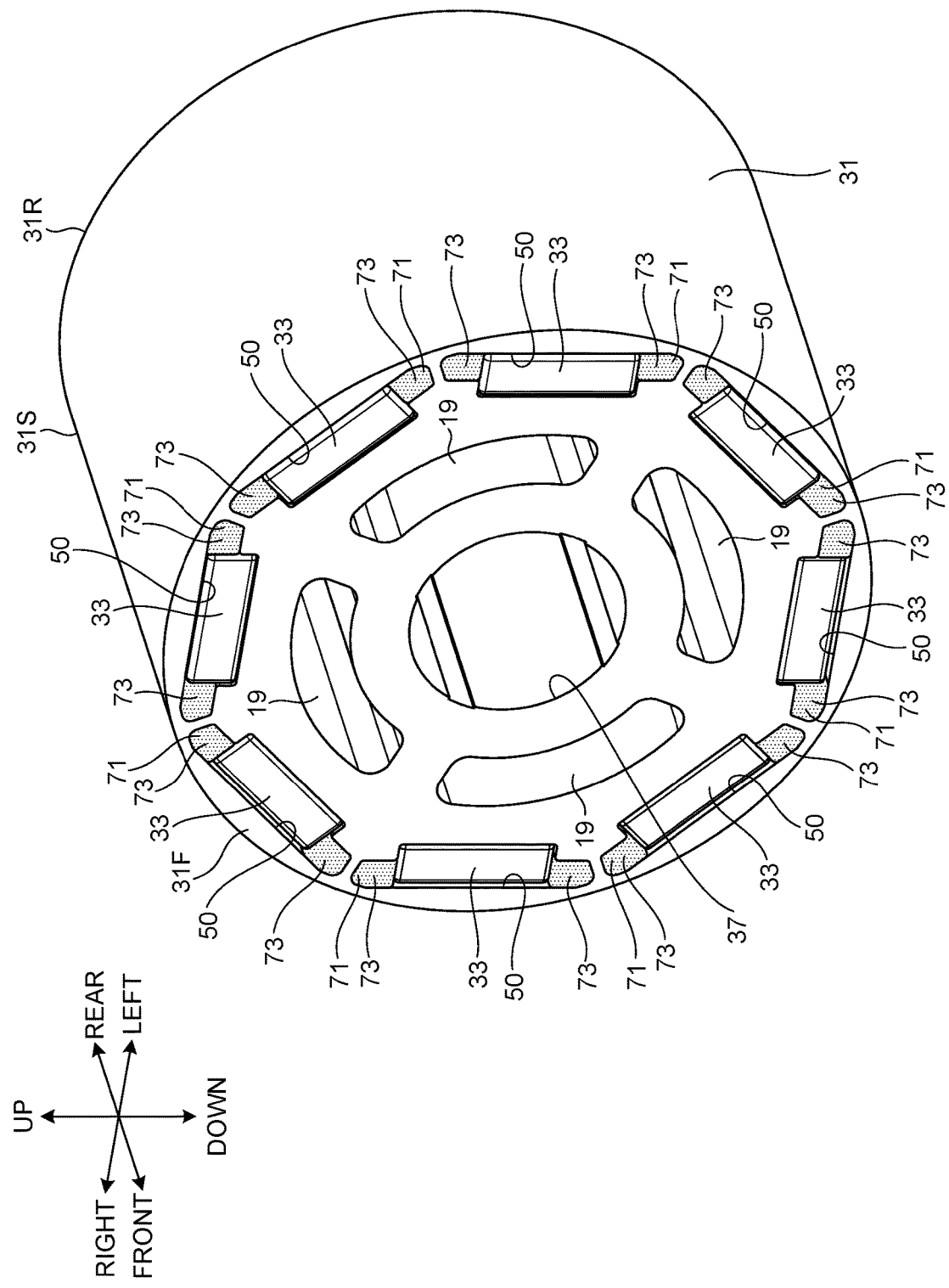
FIG. 10 is an oblique view, viewed from the front, that shows a rotor core according to the embodiment.

FIG. 10 is an oblique view, viewed from the front, that shows the rotor core 31 according to the embodiment. The rotor core 31 comprises a plurality of laminated steel sheets. Each of the steel sheets is a sheet that is made of a metal in which iron is the main component. The rotor core 31 is disposed such that it surrounds rotational axis AX. As noted above, the axial length of the rotor core 31 may be calculated by multiplying the number of laminated steel sheets by the thickness of one steel sheet in the axial direction.

The rotor core 31 is substantially circular-tube shaped. An opening (through hole) 37 is formed at (in) a center portion of the rotor core 31. The opening 37 is formed such that it goes through the front surface and the rear surface of the rotor core 31. The rotor core 31 comprises a front-end portion (side) 31F and a rear-end portion (side) 31R.

The rotor shaft 32 extends in the axial direction. The rotor shaft 32 is disposed in the interior of the rotor core 31. The rotor core 31 and the rotor shaft 32 are fixed. A front portion of the rotor shaft 32 protrudes forward from the front-end portion 31F of the rotor core 31. A rear portion of the rotor shaft 32 protrudes rearward from the rear-end portion 31R of the rotor core 31. The front portion of the rotor shaft 32 is supported in a rotatable manner by a front bearing, which is not shown. The rear portion of the rotor shaft 32 is supported in a rotatable manner by a rear bearing, which is not shown.

The saw chain 10 described above is the output part of the electric work machine 1, which is directly driven by the rotor 30. The sprocket described above is directly fixed to the rotor shaft 32. That is, in the embodiment, the motor 6 drives the saw chain 10 using a so-called direct-drive system. A speed-reducing mechanism is not disposed (operably coupled) between the motor 6 and the sprocket. It is noted that a speed-reducing mechanism may be disposed (operably coupled) between the motor 6 and the sprocket. That is, the saw chain 10, which is the output part of the electric work machine 1, may be indirectly driven by the rotor 30. The saw chain 10 can be driven with higher torque by interposing (operably coupling) a speed-reducing mechanism between the rotor 30 and the sprocket.

The permanent magnets 33 are fixed to (in) the rotor core 31. In the embodiment, the permanent magnets 33 are disposed in the interior of the rotor core 31. The motor 6 is an interior permanent magnet (IPM) motor. In the embodiment, eight of the permanent magnets 33 are disposed around rotational axis AX. More specifically, the eight permanent magnets 33 are disposed equispaced in the circumferential direction of the rotor core 31 along a virtual circumscribed circle defined (existing) in a plane perpendicular to the rotational axis AX of the rotor core.

Each of the permanent magnets 33 is a neodymium-iron-boron sintered magnet (NdFeB sintered magnet). The residual magnetic flux density of each of the permanent magnets 33 is 1.0 T or more and 1.5 T or less.

The sensor board 40 is disposed forward of the rotor core 31. The plate part 41 of the sensor board 40 is disposed around a front portion of the rotor shaft 32. The magnetic sensors 43 are supported by the plate part 41. The magnetic sensors 43 are disposed at locations at which they oppose (face) the front-end portion 31F of the rotor core 31. By disposing the magnetic sensors 43 at locations at which they oppose the front-end portion 31F of the rotor core 31, the magnetic sensors 43 detect the rotation of the rotor 30. By detecting the magnetic fluxes of the permanent magnets 33, the magnetic sensors 43 detect the position of the rotor 30 in the rotational direction.

A fan 17 is fixed to a rear portion of the rotor shaft 32. The fan 17 is disposed rearward of the rotor core 31. At least a portion of the fan 17 is disposed at a location at which it opposes the rear-end portion 31R of the rotor core 31. When the rotor shaft 32 rotates, the fan 17 rotates together with the rotor shaft 32.

The rotor core 31 comprises a plurality of magnet holes 50 provided spaced apart in the circumferential direction. The number of the magnet holes 50 is eight. The magnet holes 50 are provided equispaced in the circumferential direction. Within a plane orthogonal to rotational axis AX, the shapes of the magnet holes 50 are the same. Within a plane orthogonal to rotational axis AX, the dimensions of the magnet holes 50 are the same.

The permanent magnets 33 are respectively disposed in the magnet holes 50. A plurality of the permanent magnets 33 is disposed around rotational axis AX. In the embodiment, eight of the permanent magnets 33 are provided around rotational axis AX. The permanent magnets 33 are respectively disposed in the eight magnet holes 50, i.e. one permanent magnet 33 is disposed in each magnet hole 50. Each of the permanent magnets 33 is plate shaped. Each of the permanent magnets 33 has a rectangular-parallelepiped shape. Each of the permanent magnets 33 is elongated in the axial direction.

A gap 71 is formed between the surface of each of the permanent magnets 33, which is disposed in its corresponding magnet hole 50, and at least a portion of the inner surface of that magnet hole 50. A resin 73, such as an adhesive or bonding agent, is disposed in the gaps 71.

In the embodiment, through holes 19 are formed in the rotor core 31. Each of the through holes 19 is formed such that it goes through the front surface and the rear surface of the rotor core 31. In the radial direction, the through holes 19 are formed between the opening 37 and an outer surface 31S of the rotor core 31. Four of the through holes 19 are formed around rotational axis AX. Within a plane orthogonal to rotational axis AX, each of the through holes 19 has an arcuate shape. The weight of the rotor core 31 is reduced by the through holes 19.

Pole Count and Slot Count

As described above, in the embodiment, the motor 6 has eight of the permanent magnets 33 and six of the coils 24. That is, the pole count, which indicates the number of the permanent magnets 33, is eight. The slot count, which indicates the number of the coils 24, is six. Because the pole count is eight and the slot count is six, the motor 6 used as the motive power source of the electric work machine 1 can be made more compact.

In the explanation below, the motor 6, in which the pole count is eight and the slot count is six, is called an "8-pole/6-slot motor" 6 where appropriate. In addition, a motor in which the pole count is X and the slot count is Y is called an "X-pole/Y-slot motor" where appropriate.

Figure 11:
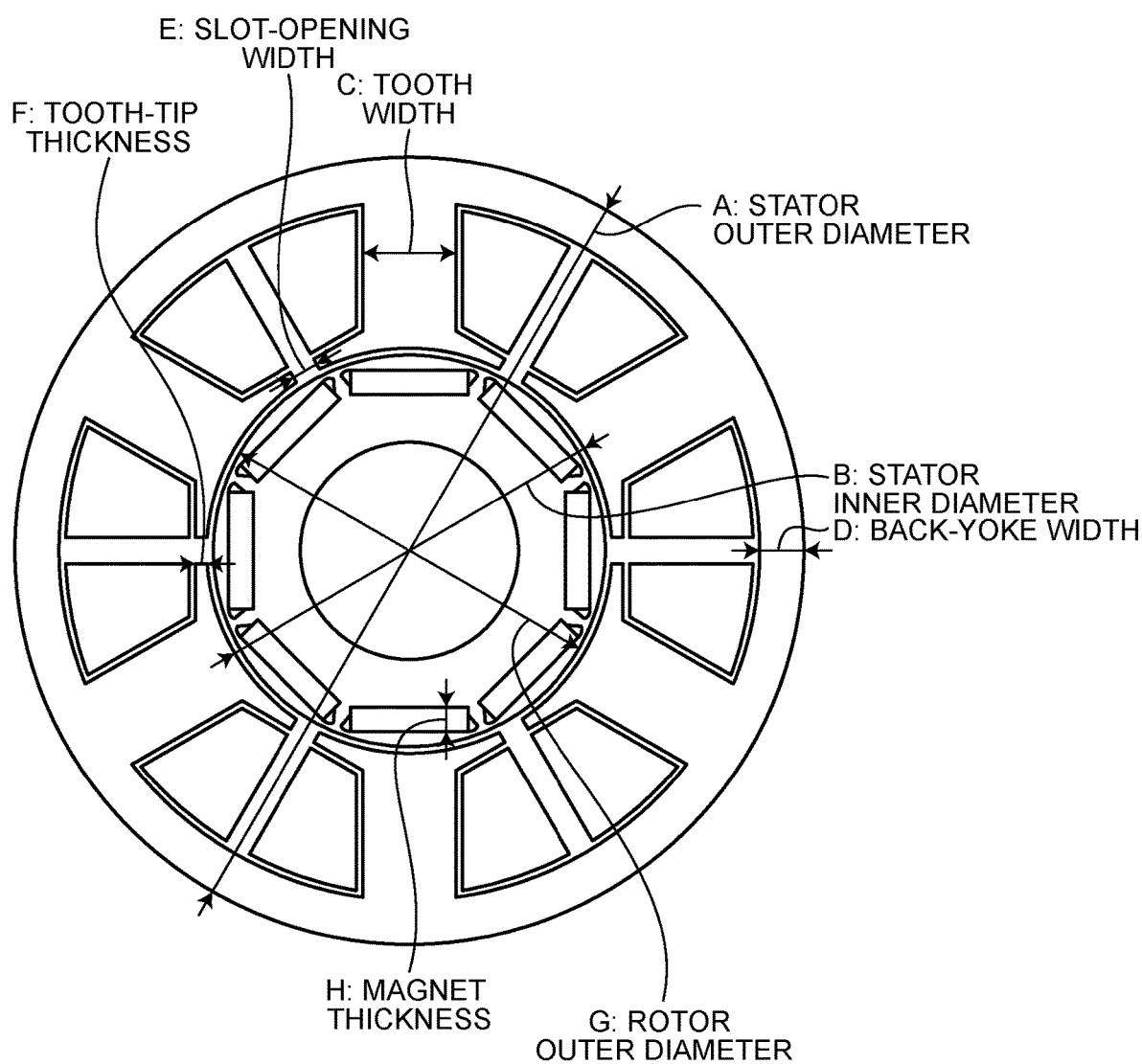
FIG. 11 is a drawing for explaining the dimensions of regions of the motor used in the power source of the electric work machine.

FIG. 11 is a drawing for explaining the dimensions of regions of the motor 6 used as the motive power source of the electric work machine 1. In an inner-rotor-type motor according to the present teachings, one or more of stator outer diameter A, stator inner diameter B, tooth width C, back-yoke width D, slot-opening width E, tooth-tip thickness F, rotor outer diameter G, and magnet thickness H are preferably prescribed in accordance with predetermined ranges.

Stator outer diameter A refers to the outer diameter of the stator core 21. Stator inner diameter B refers to the inner diameter of the stator core 21. Tooth width C refers to the dimension of each of the teeth 21T in the circumferential direction. Back-yoke width D refers to the dimension of the yoke of the stator core 21 in the radial direction. Slot-opening width E refers to the distance between projection portions of two of the teeth 21T adjacent to each other in the circumferential direction. Tooth-tip thickness F refers to the dimension of the projection portion, which is provided at a tip portion of each of the teeth 21T inward in the radial direction, in the radial direction. Rotor outer diameter G refers to the outer diameter of the rotor core 31. Magnet thickness H refers to the thickness of each of the permanent magnets 33, which indicates the dimension of the permanent magnet 33 in the radial direction.

In the following, a description of an investigation of various motor configurations is provided.

Pole-slot combinations: 4-poles/6-slots (4P6S), 6-poles/9-slots (6P9S), 8-poles/6-slots (8P6S), 8-poles/12-slots (8P12S), and 12-poles/6-slots (12P6S)

Stator outer diameter A: 40 mm or more and 70 mm or less (in 5 mm steps)

Stator outer diameter B: Rotor outer diameter G+1.0 mm

Tooth width C: 3 mm or more and 12 mm or less (in 1 mm steps)

Back-yoke width D: 0.5 times of stator inner diameter B

Slot-opening width E: 2.5 mm (fixed value)

Rotor outer diameter G: 0.45 times or more and 0.65 times or less (in 0.05 steps) of stator outer diameter A Magnet thickness H: 2 mm, 3 mm, 4 mm Rated voltage V of the battery pack 12: 36 V Theoretical unloaded rotational speed (rpm) ω of the rotor: 5,000 rpm, 12,000 rpm, 15,000 rpm, 20,000 rpm, 25,000 rpm, 30,000 rpm, 35,000 rpm, 40,000 rpm Motor resistance R: 20 mΩ

In addition, neodymium-iron-boron sintered magnets (NdFeB sintered magnets) were used as the permanent magnets of the rotor 30, which are interior permanent magnets (IPM).

Motor resistance R means the line resistance of the coils. In a three-phase motor, the line resistance of the coils refers to the line resistance between the U and V phases, the line resistance between the V and W phases, and the line resistance between the W and U phases. In the embodiment, line resistance R between the U and V phases, line resistance R between the V and W phases, and line resistance R between the W and U phases are all the same value.

FIG. 12 to FIG. 19 are charts that respectively show the axial lengths of the stator cores of multiple motors in millimeters, i.e. the dimension (in mm) of each respective stator core in the axial direction, in embodiments in which the pole-slot combination and the theoretical unloaded rotational speed of the rotor are varied, while the stator outer diameter A is held constant for each of the embodiments in a single figure. It is noted that the theoretical unloaded rotational speed is described below.

Figure 12:
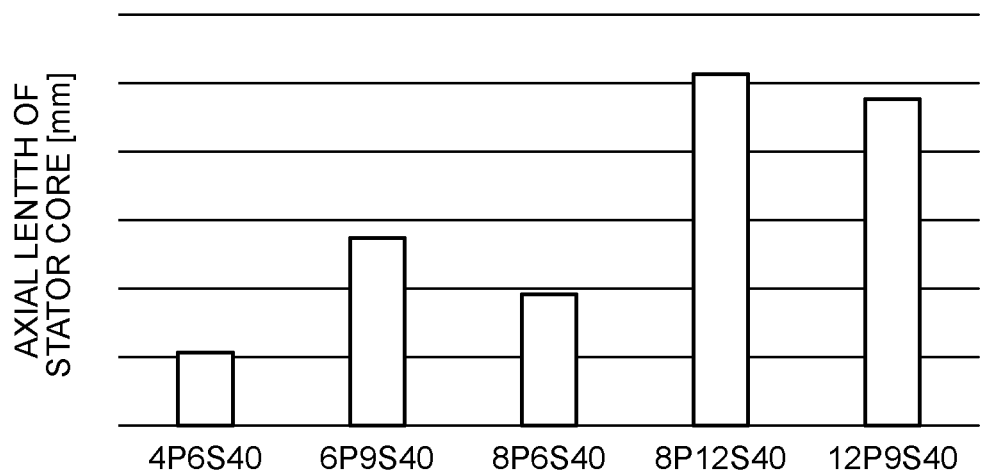
FIG. 12 is a chart that shows the relationship between the pole-slot combination and the length of the stator core in the axial direction when stator outer diameter A is 40 mm and the theoretical unloaded rotational speed of the rotor is 5,000 rpm.

More specifically, FIG. 12 is a chart that shows the relationship between pole-slot combinations (4P6S, 6P9S, 8P6S, 8P12S, 12P6S) and length of the stator core in the axial direction when stator outer diameter A is 40 mm and the theoretical unloaded rotational speed of the rotor is 5,000 rpm. In greater detail, FIG. 12 shows the minimum axial length of each of the stator cores, which is required for each of the pole-slot combinations (4P6S, 6P9S, 8P6S, 8P12S, 12P9S) to achieve (adapt to) the theoretical unloaded rotation speed of 5,000 rpm when the stator outer diameter A is 40 mm. From FIG. 12, it can be understood that, when the stator outer diameter is 40 mm and theoretical unloaded rotational speed of the rotor is 5,000 rpm, the length of stator core of the 4-pole/6-slot (4P6S) combination, from among the plurality of pole-slot combinations (4P6S, 6P9S, 8P6S, 8P12S, 12P6S), is the shortest.

Figure 13:
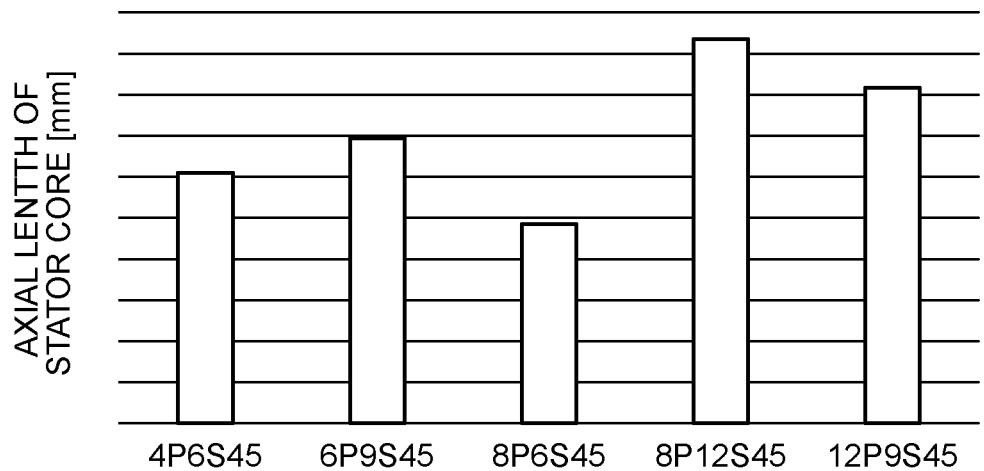
FIG. 13 is a chart that shows the relationship between the pole-slot combination and the length of the stator core in the axial direction when stator outer diameter A is 45 mm and the theoretical unloaded rotational speed of the rotor is 5,000 rpm.

FIGS. 13-19 are similar to FIG. 12. Thus, FIG. 13 is a chart that shows the relationship between pole-slot combinations (4P6S, 6P9S, 8P6S, 8P12S, 12P6S) and the minimum length of each of the stator cores in the axial direction when stator outer diameter A is 45 mm and the theoretical unloaded rotational speed of the rotor is 5,000 rpm.

Figure 14:
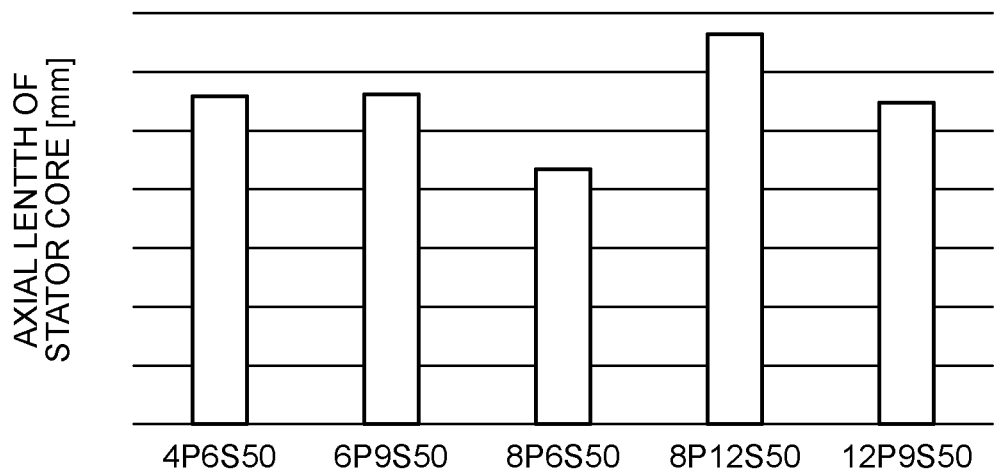
FIG. 14 is a chart that shows the relationship between the pole-slot combination and the length of the stator core in the axial direction when stator outer diameter A is 50 mm and the theoretical unloaded rotational speed of the rotor is 20,000 rpm.

FIG. 14 a chart that shows the relationship between pole-slot combinations (4P6S, 6P9S, 8P6S, 8P12S, 12P6S) and the minimum length of each of the stator cores in the axial direction when stator outer diameter A is 50 mm and the theoretical unloaded rotational speed ω of the rotor is 20,000 rpm.

Figure 15:
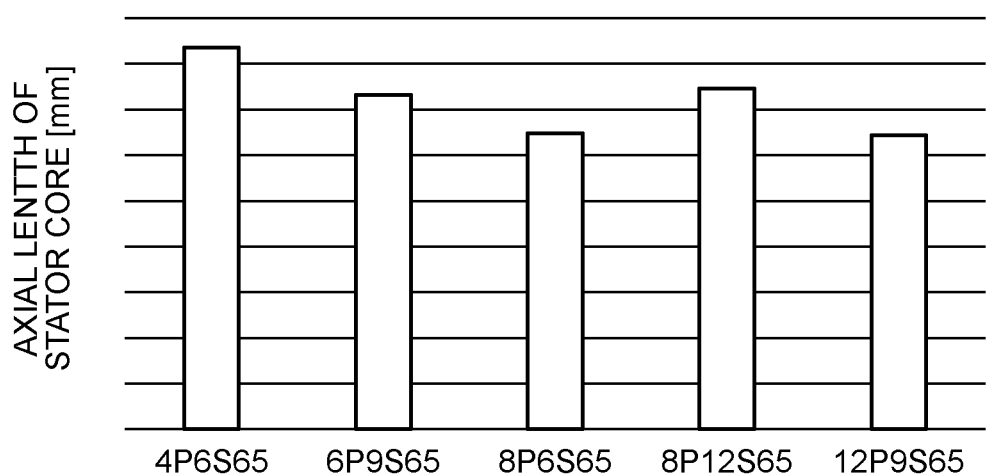
FIG. 15 is a chart that shows the relationship between the pole-slot combination and the length of the stator core in the axial direction when stator outer diameter A is 65 mm and the theoretical unloaded rotational speed of the rotor is 25,000 rpm.

FIG. 15 a chart that shows the relationship between pole-slot combinations (4P6S, 6P9S, 8P6S, 8P12S, 12P6S) and the minimum length of each of the stator cores in the axial direction when stator outer diameter A is 65 mm and the theoretical unloaded rotational speed ω of the rotor is 25,000 rpm.

Figure 16:
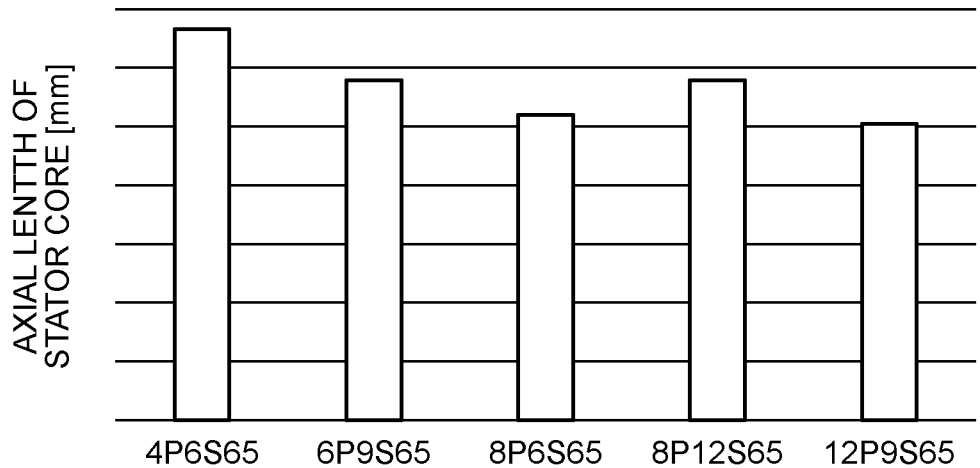
FIG. 16 is a chart that shows the relationship between the pole-slot combination and the length of the stator core in the axial direction when stator outer diameter A is 65 mm and the theoretical unloaded rotational speed of the rotor is 30,000 rpm.

FIG. 16 a chart that shows the relationship between pole-slot combinations (4P6S, 6P9S, 8P6S, 8P12S, 12P6S) and the minimum length of each of the stator cores in the axial direction when stator outer diameter A is 65 mm and the theoretical unloaded rotational speed ω of the rotor is 30,000 rpm.

Figure 17:
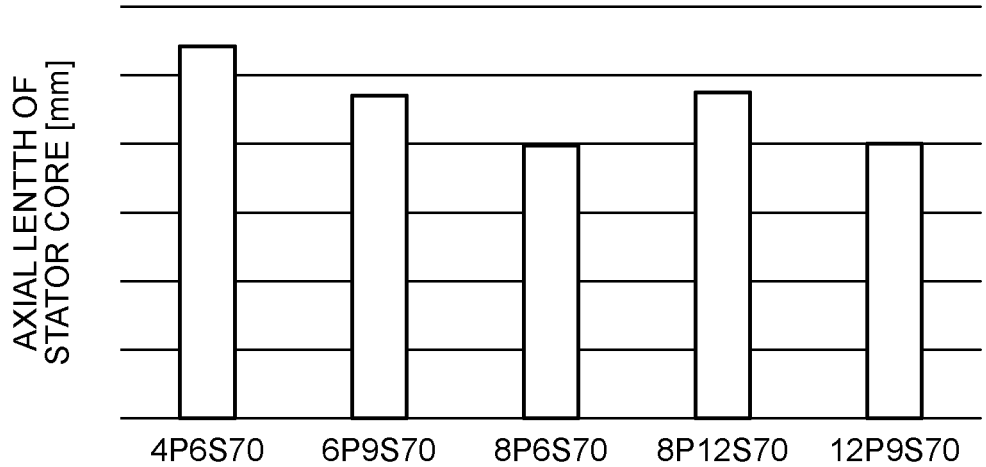
FIG. 17 is a chart that shows the relationship between the pole-slot combination and the length of the stator core in the axial direction when stator outer diameter A is 70 mm and the theoretical unloaded rotational speed of the rotor is 15,000 rpm.

FIG. 17 a chart that shows the relationship between pole-slot combinations (4P6S, 6P9S, 8P6S, 8P12S, 12P6S) and the minimum length of each of the stator cores in the axial direction when stator outer diameter A is 70 mm and theoretical unloaded rotational speed ω of the rotor is 15,000 rpm.

Figure 18:
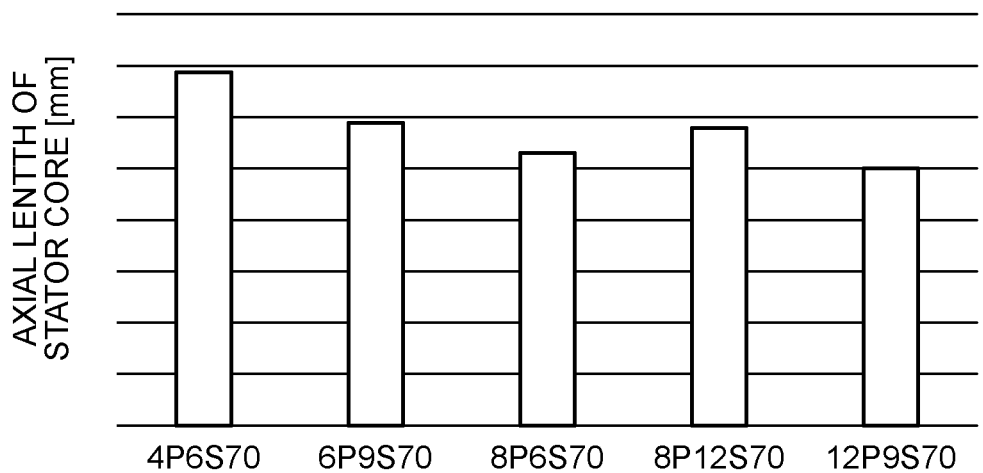
FIG. 18 is a chart that shows the relationship between the pole-slot combination and the length of the stator core in the axial direction when stator outer diameter A is 70 mm and the theoretical unloaded rotational speed of the rotor is 25,000 rpm.

FIG. 18 a chart that shows the relationship between pole-slot combinations (4P6S, 6P9S, 8P6S, 8P12S, 12P6S) and the minimum length of each of the stator cores in the axial direction when stator outer diameter A is 70 mm and theoretical unloaded rotational speed ω of the rotor is 25,000 rpm.

Figure 19:
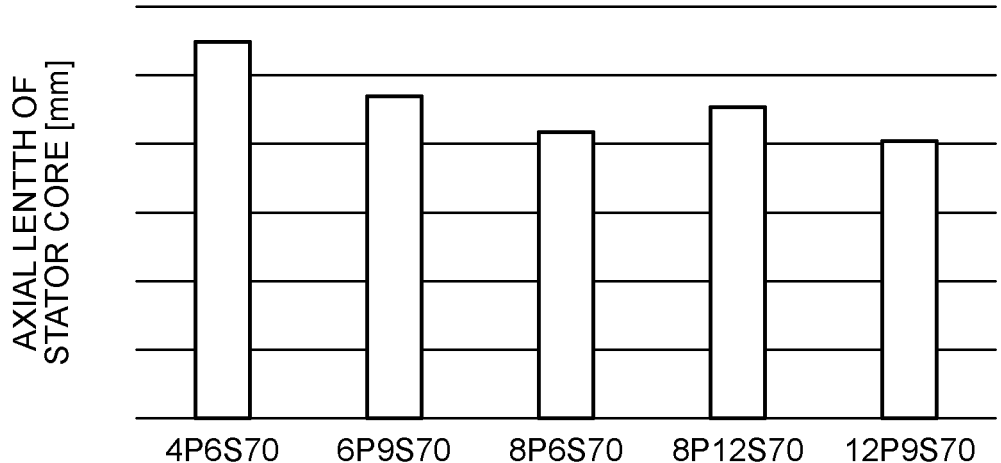
FIG. 19 is a chart that shows the relationship between the pole-slot combination and the length of the stator core in the axial direction when stator outer diameter A is 70 mm and the theoretical unloaded rotational speed of the rotor is 30,000 rpm.

FIG. 19 a chart that shows the relationship between pole-slot combinations (4P6S, 6P9S, 8P6S, 8P12S, 12P6S) and the minimum length of each of the stator cores in the axial direction when stator outer diameter A is 70 mm and theoretical unloaded rotational speed ω of the rotor is 30,000 rpm.

Thus, from FIGS. 12-19, for each combination of stator outer diameter and target theoretical unloaded rotational speed, the pole-slot combination having the shortest length of the stator core in the axial direction from among the pole-slot combinations can be found. In greater detail, as shown in FIG. 12, when stator outer diameter A is 40 mm and theoretical unloaded rotational speed ω of the rotor is 5,000 rpm, the minimum axial length of the stator core of the 4-pole/6-slot (4P6S) combination, from among the plurality of pole-slot combinations (4P6S, 6P9S, 8P6S, 8P12S, 12P6S), is the smallest.

As shown in FIG. 13, when stator outer diameter A is 45 mm and theoretical unloaded rotational speed ω of the rotor is 5,000 rpm, the minimum axial length of the stator core of the 8-pole/6-slot (8P6S) combination, from among the plurality of pole-slot combinations (4P6S, 6P9S, 8P6S, 8P12S, 12P6S), is the smallest.

As shown in FIG. 14, when stator outer diameter A is 50 mm and the theoretical unloaded rotational speed ω of the rotor is 20,000 rpm, the minimum axial length of the stator core of the 8-pole/6-slot (8P6S) combination, from among the plurality of pole-slot combinations (4P6S, 6P9S, 8P6S, 8P12S, 12P6S), is the smallest.

As shown in FIG. 15, when stator outer diameter A is 65 mm and theoretical unloaded rotational speed ω of the rotor is 25,000 rpm, the minimum axial length of the stator core of the 8-pole/6-slot (8P6S) combination, from among the plurality of pole-slot combinations (4P6S, 6P9S, 8P6S, 8P12S, 12P6S), is the smallest.

As shown in FIG. 16, when stator outer diameter A is 65 mm and theoretical unloaded rotational speed ω of the rotor is 30,000 rpm, the minimum axial length of the stator core of the 12-pole/9-slot (12P9S) combination from among the plurality of pole-slot combinations (4P6S, 6P9S, 8P6S, 8P12S, 12P6S) is the smallest.

As shown in FIG. 17, when stator outer diameter A is 70 mm and theoretical unloaded rotational speed ω of the rotor is 15,000 rpm, the minimum axial length of the stator core of the 8-pole/6-slot (8P6S) combination, from among the plurality of pole-slot combinations (4P6S, 6P9S, 8P6S, 8P12S, 12P6S), is the smallest.

As shown in FIG. 18, when stator outer diameter A is 70 mm and theoretical unloaded rotational speed ω of the rotor is 25,000 rpm, the minimum axial length of the stator core of the 12-pole/9-slot (12P9S) combination, from among the plurality of pole-slot combinations (4P6S, 6P9S, 8P6S, 8P12S, 12P6S), is the smallest.

As shown in FIG. 19, when stator outer diameter A is 70 mm and theoretical unloaded rotational speed ω of the rotor is 30,000 rpm, the minimum axial length of the stator core of the 12-pole/9-slot (12P9S) combination, from among the plurality of pole-slot combinations (4P6S, 6P9S, 8P6S, 8P12S, 12P6S), is the smallest.

The evaluations shown in FIG. 12 to FIG. 19 were performed for embodiments in which stator outer diameter A was 40, 45, 50, 55, 60, 65, or 70 mm and the theoretical unloaded rotational speed was 5,000, 12,000, 15,000, 20,000, 25,000, 30,000, 35,000, or 40,000 rpm.

The table shown in FIG. 20 was prepared based on the results shown in FIGS. 12-19 and on results obtained from additional experiments. In the table of FIG. 20, "◯" indicates the conditions (i.e., combination of stator outer diameter A and theoretical unloaded rotational speed) for which an 8-pole/6-slot (8P6S) combination has the shortest axial length of the stator core from among the plurality of pole-slot combinations (4P6S, 6P9S, 8P6S, 8P12S, 12P6S), and "X" indicates the conditions for which any of pole-slot combinations (4P6S, 6P9S, 8P12S, 12P6S) other than the 8-pole/6-slot (8P6S) combination has the shortest axial length of the stator core. In short, FIG. 20 shows the relationship between stator outer diameter A and the theoretical unloaded rotational speed ω of the rotor with respect to whether the length of the stator core in the axial direction is smallest for an 8-pole/6-slot combination. It is noted that induced voltage constant k and coefficient α shown in FIG. 20 are described below. As shown in FIG. 20, the marks "◯" are distributed over a wide range in the table. That is, it can be understood that the 8-pole/6-slot (8P6S) combination has the shortest axial length of the stator core from among the pole-slot combinations (4P6S, 6P9S, 8P6S, 8P12S, 12P6S) for the numerous conditions that are marked with "◯" (i.e. for many combinations of stator outer diameter A and theoretical unloaded rotational speed). In other words, although any of the pole-slot combinations (4P6S, 6P9S, 8P12S, 12P6S) other than the 8-pole/6-slot (8P6S) combination has also the shortest axial length for the conditions marked with "X", the range of conditions applicable to the 8-pole/6-slot (8P6S) combination is wider than the range of the conditions applicable to each of other pole-slot combinations (4P6S, 6P9S, 8P12S, 12P6S).

From the data shown in FIG. 20, it can be understood that brushless motors, which may be advantageously used as the motive power source of an electric power tool and/or outdoor power equipment, can be effectively made more compact in the axial direction using the 8-pole/6-slot (8P6S) combination.

As shown in FIG. 20, it is understood that, when stator outer diameter A is 40 mm or more and 60 mm or less, the length of the stator core in the axial direction is smallest for the 8-pole/6-slot (8P6S) combination, even if the theoretical unloaded rotational speed to is varied between 5,000 rpm and 40,000 rpm.

In addition, it is understood that, when stator outer diameter A is 65 mm, the length of the stator core in the axial direction is smallest for the 8-pole/6-slot (8P6S) combination when theoretical unloaded rotational speed to is in the range of 5,000 rpm or more and 25,000 rpm or less.

In addition, it is understood that, when stator outer diameter A is 70 mm, the length of the stator core in the axial direction is smallest for the 8-pole/6-slot (8P6S) combination when theoretical unloaded rotational speed to is in the range of 5,000 rpm or more and 15,000 rpm or less.

Consequently, it is preferable that stator outer diameter A [mm] satisfies the condition below.

$$45 \leq A \leq 70$$

Stator outer diameter A [mm] more preferably satisfies the condition below.

$$45 \leq A \leq 65$$

Stator outer diameter A [mm] yet more preferably satisfies the condition below.

$$45 \leq A \leq 60$$

Next, as described above, with regard to the conditions under which the length of the stator core in the axial direction is smallest for an 8-pole/6-slot combination, it was assumed that the range up to 1.1 times of the smallest length of the stator core in the axial direction was an optimal design. Then, rotor outer diameter G and tooth width C at which the design was optimal were studied.

Figure 21:
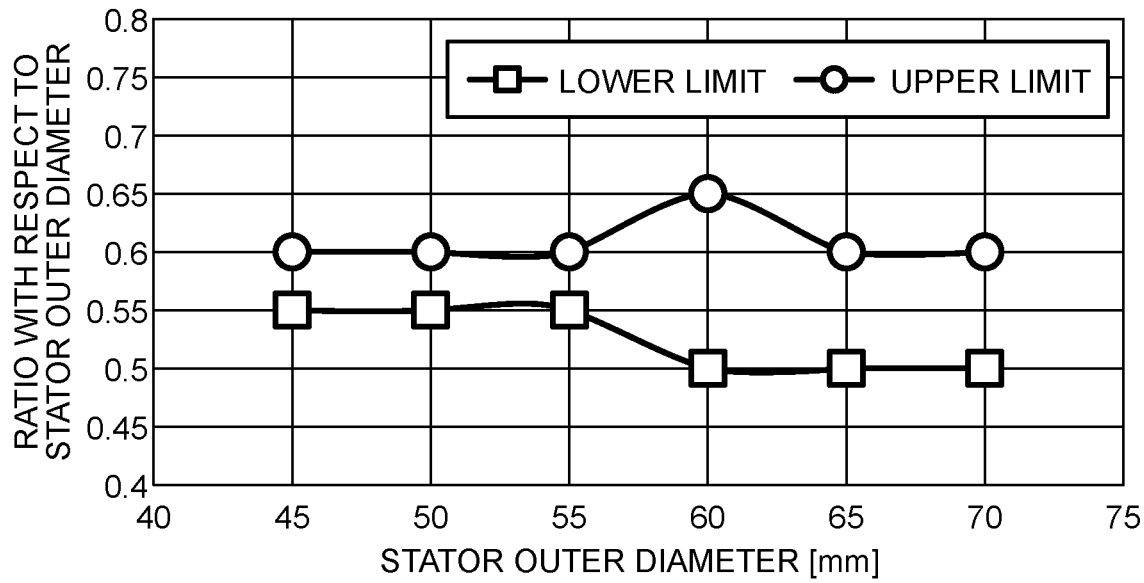
FIG. 21 is a graph that shows the relationship between stator outer diameter A and rotor outer diameter G for an optimal design when the theoretical unloaded rotational speed is 12,000 rpm.
Figure 22:
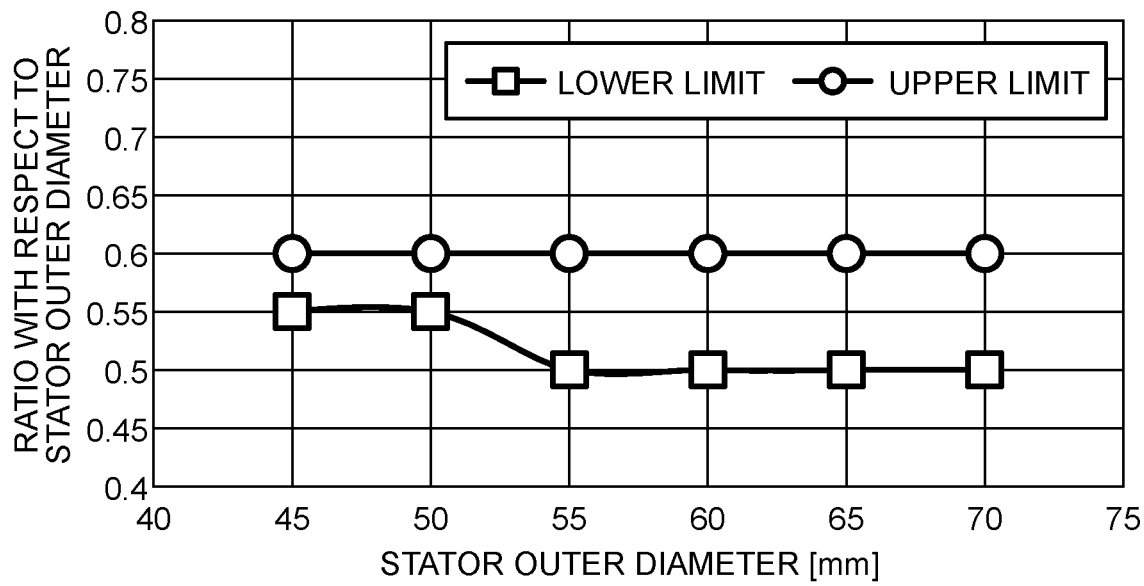
FIG. 22 is a graph that shows the relationship between stator outer diameter A and rotor outer diameter G for an optimal design when the theoretical unloaded rotational speed is 20,000 rpm.
Figure 23:
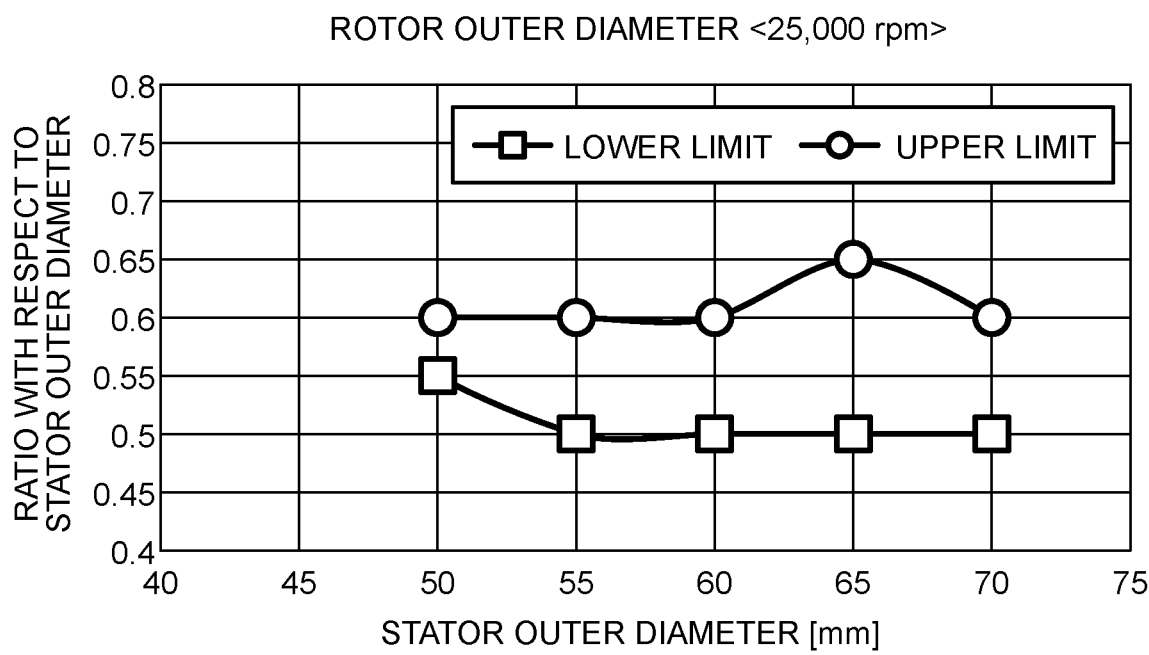
FIG. 23 is a graph that shows the relationship between stator outer diameter A and rotor outer diameter G for an optimal design when the theoretical unloaded rotational speed is 25,000 rpm.
Figure 24:
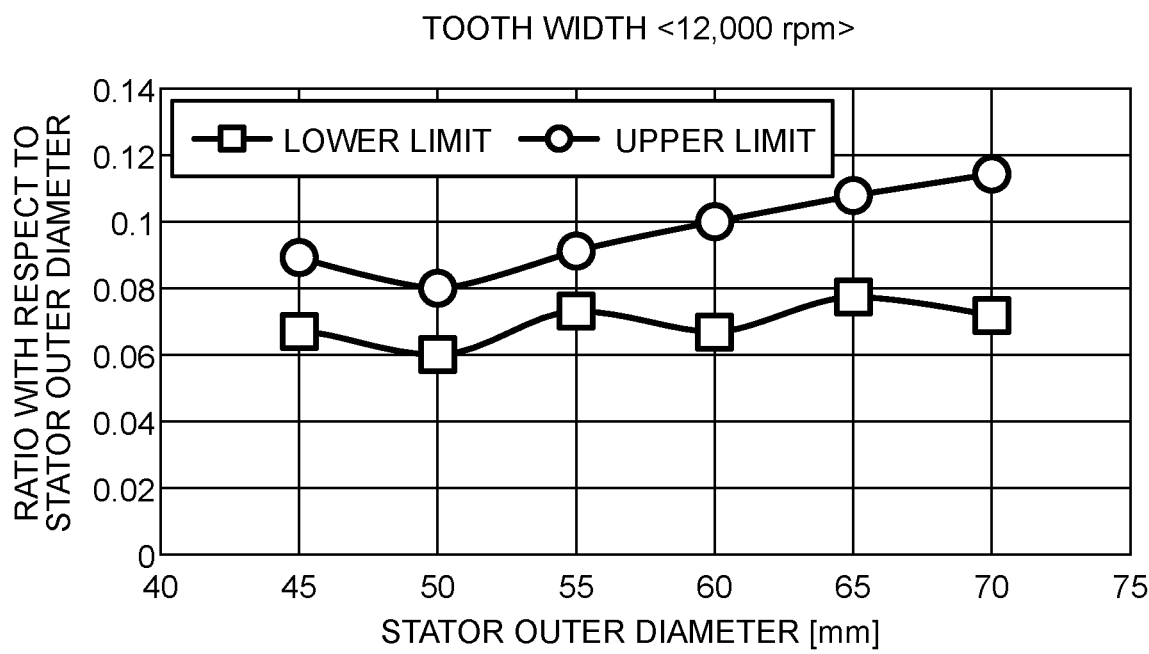
FIG. 24 is a graph that shows the relationship between stator outer diameter A and tooth width C for an optimal design when the theoretical unloaded rotational speed is 12,000 rpm.
Figure 25:
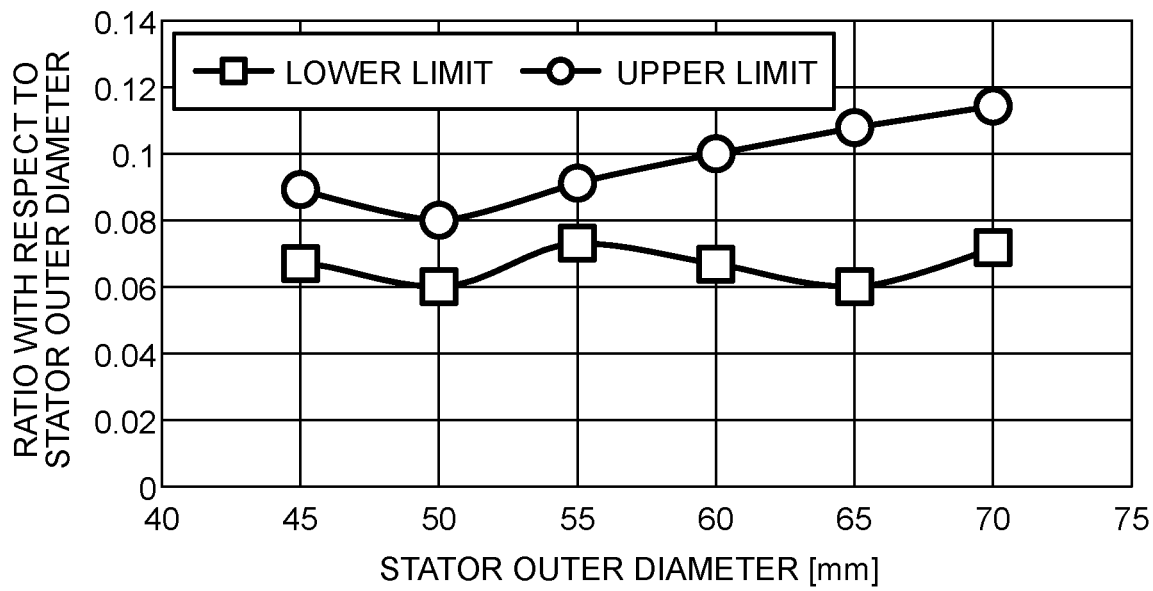
FIG. 25 is a graph that shows the relationship between stator outer diameter A and tooth width C for an optimal design when the theoretical unloaded rotational speed is 20,000 rpm.
Figure 26:
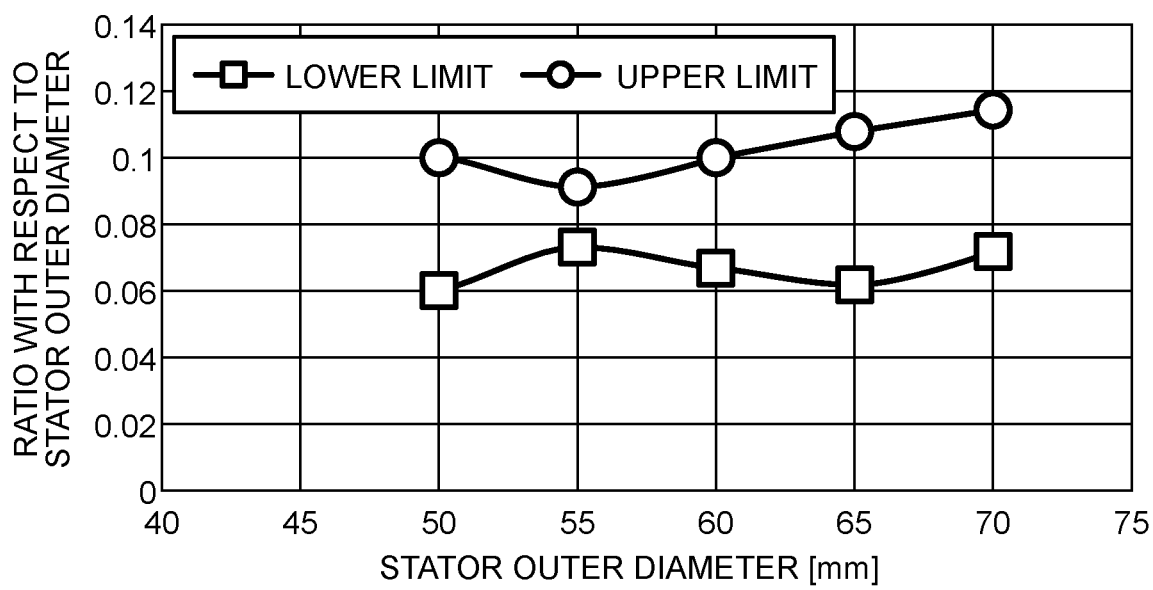
FIG. 26 is a graph that shows the relationship between stator outer diameter A and tooth width C for an optimal design when the theoretical unloaded rotational speed is 25,000 rpm.

FIGS. 21-23 respectively show graphs for demonstrating the relationship between stator outer diameter A and rotor outer diameter G at which the design was optimal. FIGS. 24-26 respectively show graphs for demonstrating the relationship between stator outer diameter A and tooth width C at which the design was optimal.

More specifically, FIGS. 21-23 respectively show the relationship between stator outer diameter A and rotor outer diameter G when theoretical unloaded rotational speed ω was 12,000 rpm, 20,000 rpm, or 25,000 rpm. As shown in FIGS. 21-23, as long as rotor outer diameter G was 0.5 times or more and 0.65 times or less of stator outer diameter A, an optimal design that can make the motor 6 compact was confirmed.

Thus, when the stator outer diameter, which indicates the outer diameter of the stator core, is given as A [mm] and the rotor outer diameter, which indicates the outer diameter of the rotor core, is given as G [mm], it is preferable to satisfy the condition below.

$$0.5 \times A \leq G \leq 0.65 \times A$$

Similarly, FIGS. 24-26 respectively show the relationship between stator outer diameter A and tooth width C when theoretical unloaded rotational speed ω was 12,000 rpm, 20,000 rpm, or 25,000 rpm. As shown in FIGS. 24-26, as long as tooth width C was 0.06 times or more and 0.114 times or less of stator outer diameter A, an optimal design that can make the motor 6 compact was confirmed.

Thus, when the stator outer diameter, which indicates the outer diameter of the stator core, is given as A [mm] and the tooth width, which indicates the dimension of the tooth in the circumferential direction, is given as C [mm], it is preferable to satisfy the condition below.

$$0.06 \times A \leq C \leq 0.114 \times A$$

Optimal designs that make the motor 6 more compact were further studied. The optimal values that make the motor 6 more compact are indicated below.

When the back-yoke width, which indicates the dimension of the yoke of the stator core in the radial direction, is given as D [mm], it is preferable to satisfy the condition below.

$$0.5 \times C \leq D \leq 0.5 \times C + 2$$

When the magnet thickness, which indicates the dimension of the permanent magnet in the radial direction, is given as H [mm], it is preferable to satisfy the condition below.

$$2.0 \leq H \leq 4.0$$

When the air gap, which indicates the gap between the stator core and the rotor core in the radial direction, is given as J [mm], it is preferable to satisfy the condition below.

$$0.4 \leq J \leq 0.6$$

When the axial length of the stator core, i.e. the dimension of the stator core in the axial direction, is given as K [mm], it is preferable to satisfy the condition below.

$$K \leq 50$$

When the axial length of the rotor core, i.e. the dimension of the rotor core in the axial direction, is given as L [mm], it is preferable to satisfy the condition below.

$$K \leq L \leq K + 10$$

When the tooth-tip thickness, which indicates the dimension in the radial direction of the projection portion provided on the tip portion of the tooth inward in the radial direction, is given as F [mm], it is preferable to satisfy the condition below.

$$0.5 \leq F \leq 1.5$$

Induced Voltage Constant and Coefficient

Next, the results of a study of induced voltage constant k and coefficient α, using a motor 6 having an 8-pole/6-slot combination, will be explained.

Induced voltage constant k [V/krpm] and coefficient α [mΩ/(V/krpm)²], which indicate motor performance, are prescribed. Induced voltage constant k is expressed by Equation (1) below. Coefficient α is expressed by Equation (2) below.

Mathematical Equation 1

$$k = \frac{E}{\omega} \tag{1}$$

Mathematical Equation 2

$$\alpha = \frac{R}{k^2} \tag{2}$$

In Equation (1), E [V] is the induced voltage of the motor, and ω[krpm] is theoretical unloaded rotational speed co of the rotor of the motor. In Equation (2), R [mΩ] is the motor resistance.

As is understood from Equation (1), induced voltage constant k prescribes the relationship between induced voltage E and theoretical unloaded rotational speed ω of the motor. As is understood from Equation (2), coefficient α prescribes the relationship between induced voltage constant k and motor resistance R.

By defining a range of the induced voltage constant k [V/krpm], if induced voltages E of the motor are determined (measured), then theoretical unloaded rotational speeds co can be determined using Equation (1).

By defining a range of coefficient α [mΩ/(V/krpm)²], if induced voltage constants k are determined using Equation (1), then motor resistances R can be determined using Equation (2). By determining the induced voltage constants k and the motor resistances R, motor performance can be determined. This means that the coefficient α can be used as a motor design condition (parameter). In other words, for coefficients α that fall within the specified range, equivalent motor designs are achieved even if drive voltages, rotational speeds and motor resistances are different.

Induced Voltage

Figure 27:
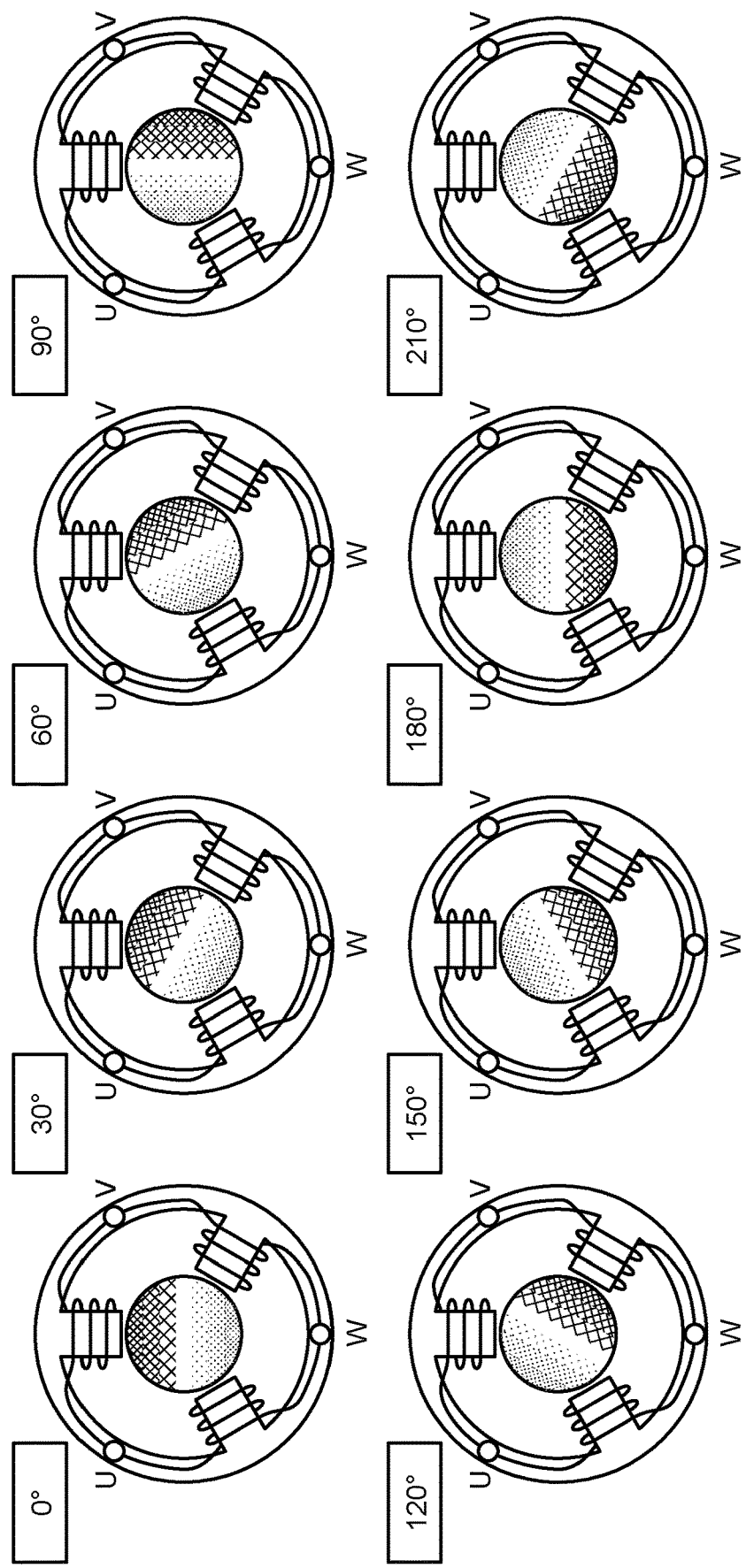
FIG. 27 shows views of an electric motor at different rotational positions of the rotor relative to the stator for explaining induced voltage.
Figure 28:
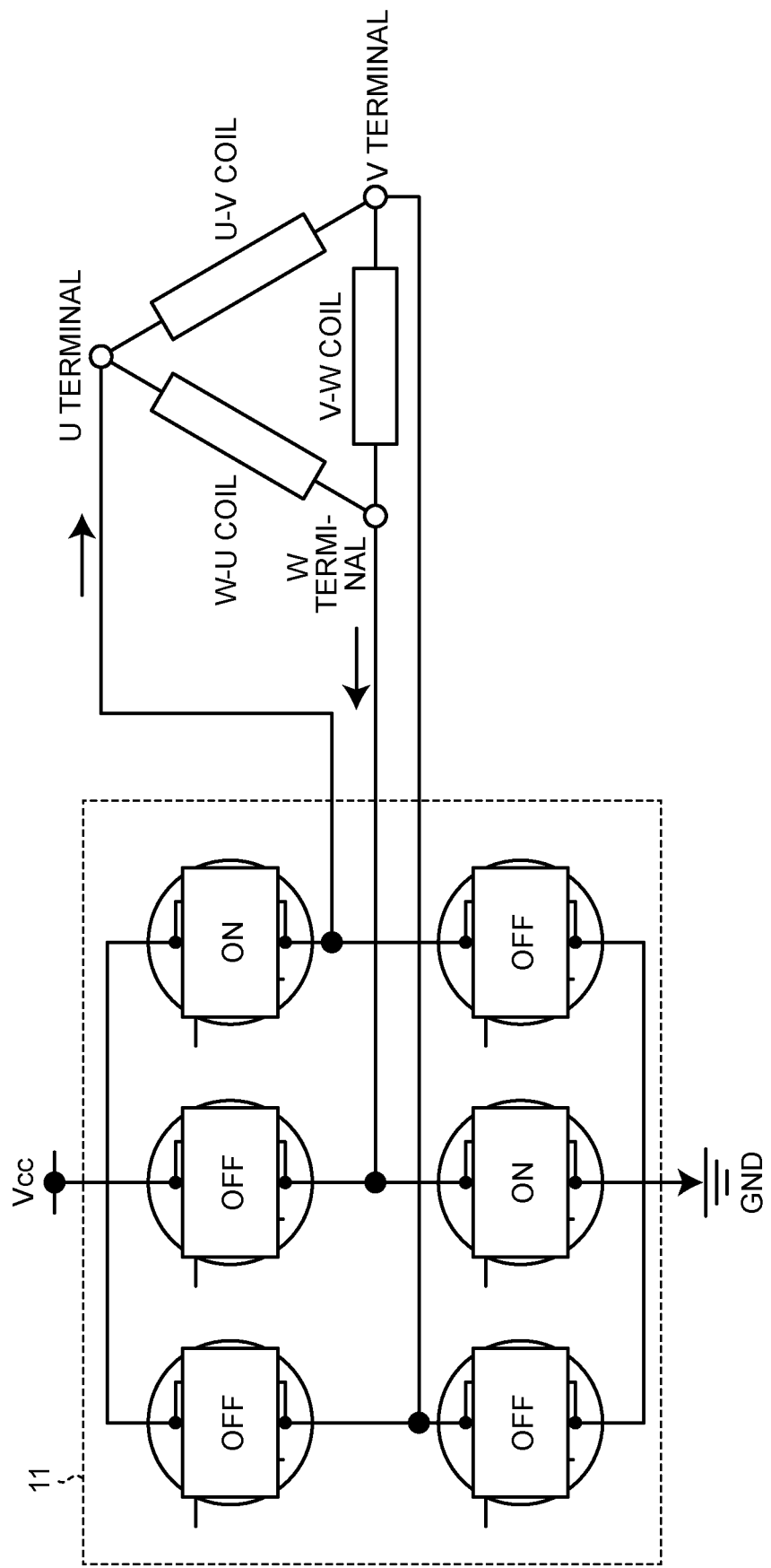
FIG. 28 shows the wiring structure of the coils.
Figure 29:
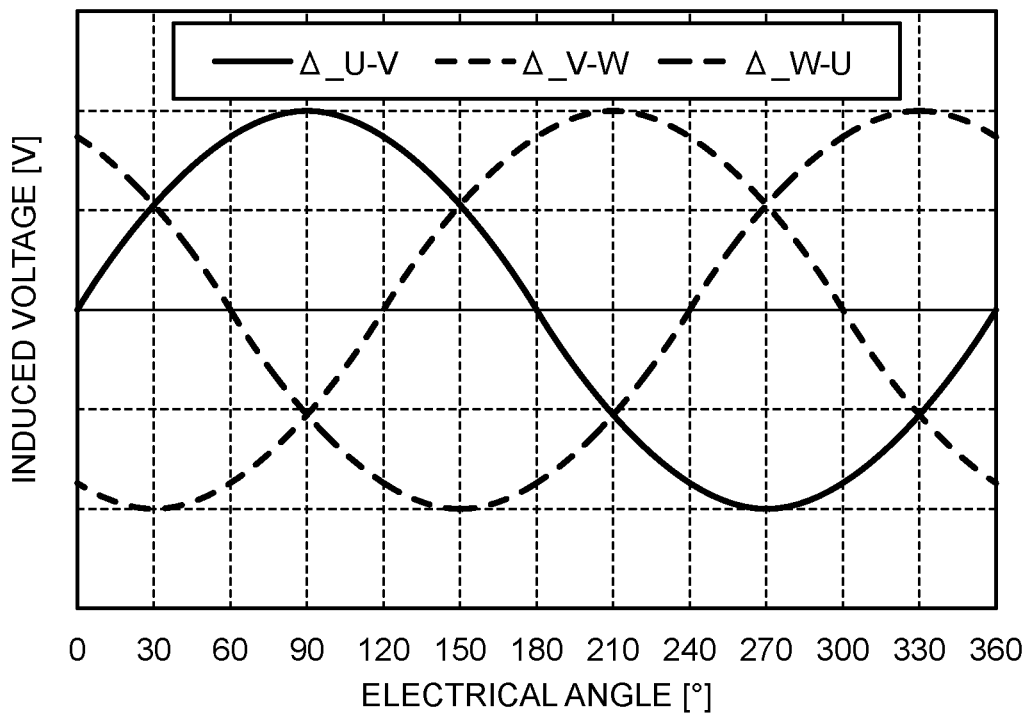
FIG. 29 is a graph that shows the relationship between electrical angle and induced voltage.

Induced voltage will now be explained. FIG. 27 includes drawings for explaining induced voltage. For the sake of simplicity, FIG. 27 shows the relationship between the position of the rotor, which has a 2-pole/3-slot configuration and is delta connected, in the rotational direction and the induced voltage. FIG. 28 shows the wiring structure of the coils. The three coils shown in FIG. 27 are delta connected as shown in FIG. 28. FIG. 29 is a graph that shows the relationship between electrical angle and induced voltage.

Induced voltage refers to voltage that, in response to an increase in magnetic flux linked to a coil, is generated in a direction that inhibits that increase in magnetic flux. In other words, induced voltage is the electromotive force (voltage) that opposes a change in current that induced it. With regard to the motor, induced voltages are generated between the terminals of each of the U terminal, the V terminal, and the W terminal in accordance with (in proportion to) the rotational speed of the rotor.

The angles shown in FIG. 27 indicate rotational angles (mechanical angles) of the rotor. Because the motor in the example shown in FIG. 27 has two poles, the rotational angle (mechanical angle) of the rotor is equal to the electrical angle. The electrical angle refers to the angle defined as 360° when the N pole and the S pole have rotated for one period. For example, in the case of a 2-pole motor and a mechanical angle of 1°, the electrical angle is also 1°. In the case of a four-pole motor and a mechanical angle of 1°, the electrical angle is 2°. As shown in FIG. 28, when the rotor is caused to rotate, the controller 11 switches the plurality of FETs using a plurality of switching patterns (current waveforms) based on the detection results of the magnetic sensors 43. Drive voltages corresponding to the position of the rotor are impressed (applied), and thereby electric currents flow to the coils, and by using the attraction and the repulsion of the teeth and the rotor, in which the teeth around which the coils are wound serve as electromagnets, the rotor is caused to rotate. Induced voltage E is generated between the terminals as shown in FIG. 29.

Figure 30:
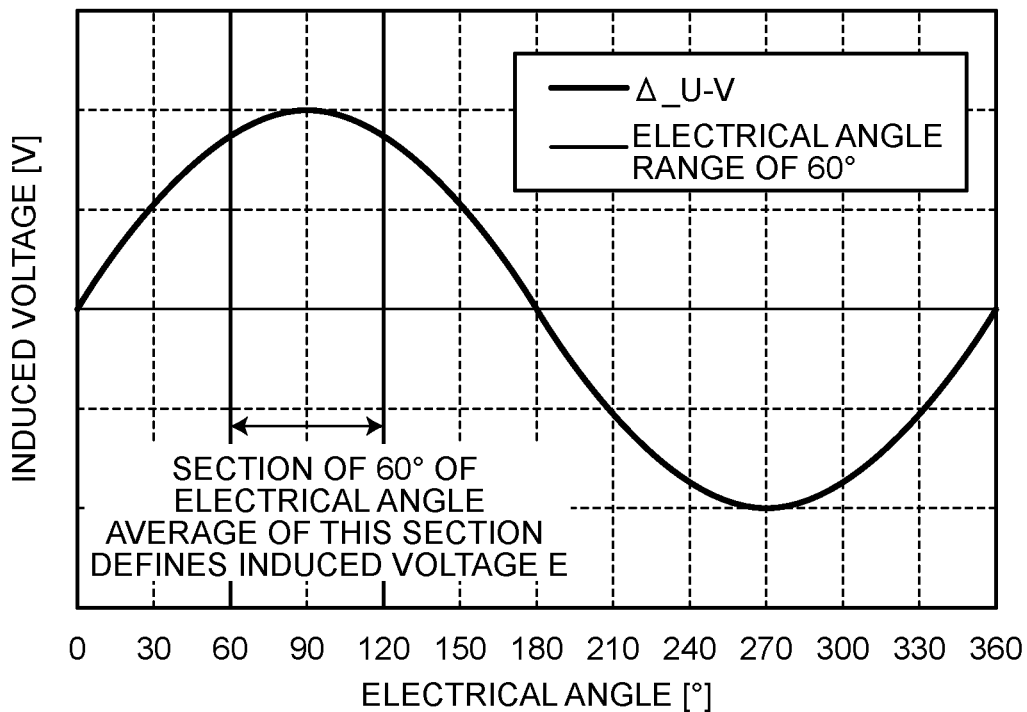
FIG. 30 is another graph that shows the relationship between electrical angle and induced voltage.

Only a portion of the induced voltage, which is related to the operation of the motor, shown in FIG. 29 is used. FIG. 30 is a graph that shows the relationship between electrical angle and induced voltage. As shown in FIG. 30, the average induced voltage for an electrical angle range of 60° centered on the electrical angle of 90° affects the motor drive. In the embodiment, as shown in FIG. 30, the average value of an electrical angle range of 60° is defined as induced voltage E. Because the six FETs shown in FIG. 28 are energized over an electrical angle of 360° using six switching patterns (current waveforms), the induced voltage for an electrical angle of 60° is used.

When the number of windings (turns) of the coil is given as n and the amount of magnetic flux associated with one winding (turn) of the coil is given as φ, induced voltage E is expressed by Equation (3) below in view of the flux linkage resulting from multiple windings.

Mathematical Equation 3

$$E = -n\frac{d\varphi}{dt} \quad (3)$$

As is understood from Equation (3), the magnitude of induced voltage E is determined by the amount of change in the magnetic flux. That is, the larger the absolute value of the magnetic flux, the larger is the induced voltage E. In addition, when the rotational speed is high, and when the pole count is high and the rate at which the magnetic flux changes is high, the induced voltage E becomes large.

Figure 31:
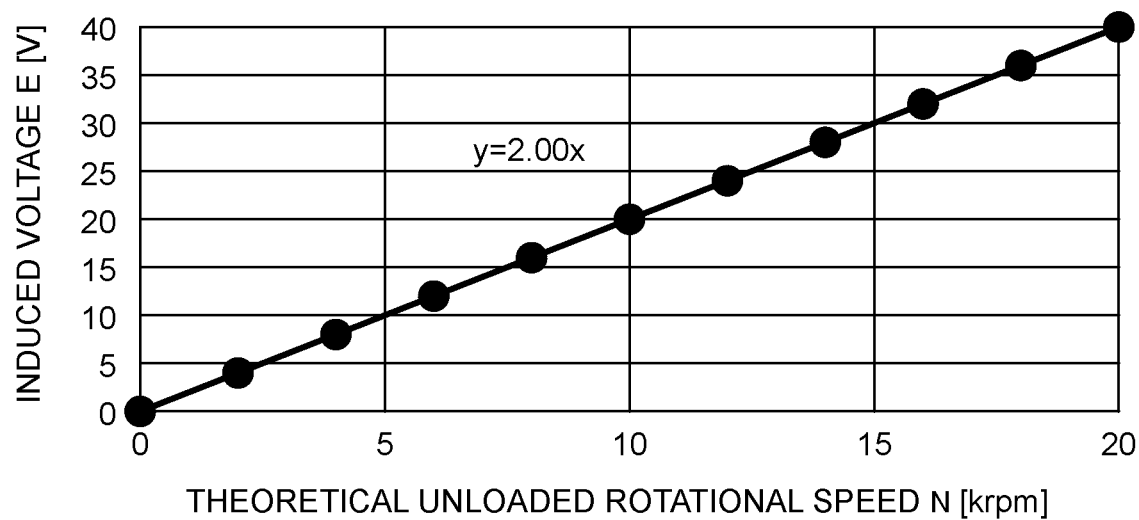
FIG. 31 is a graph that shows the relationship between theoretical unloaded rotational speed and induced voltage.

FIG. 31 is a graph that shows the relationship between theoretical unloaded rotational speed ω and induced voltage E. In FIG. 31, the abscissa is the theoretical unloaded rotational speed ω and the ordinate is the induced voltage E. As is understood from Equation (1), the slope of the graph shown in FIG. 31 corresponds to induced voltage constant k.

Theoretical Unloaded Rotational Speed

Figure 32:
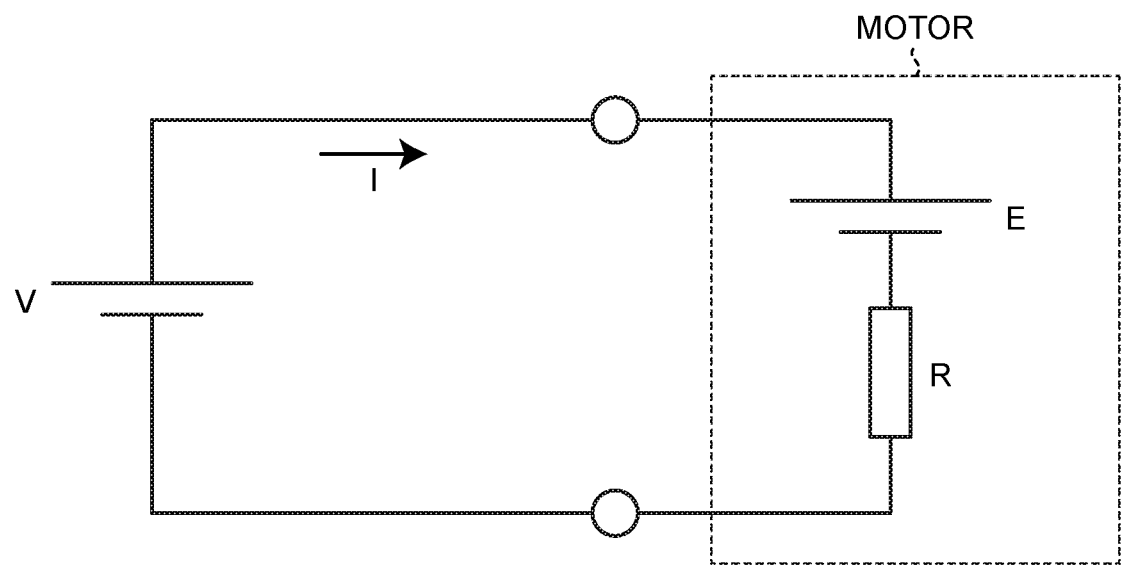
FIG. 32 shows a simple equivalent circuit of the motor.
Figure 33:
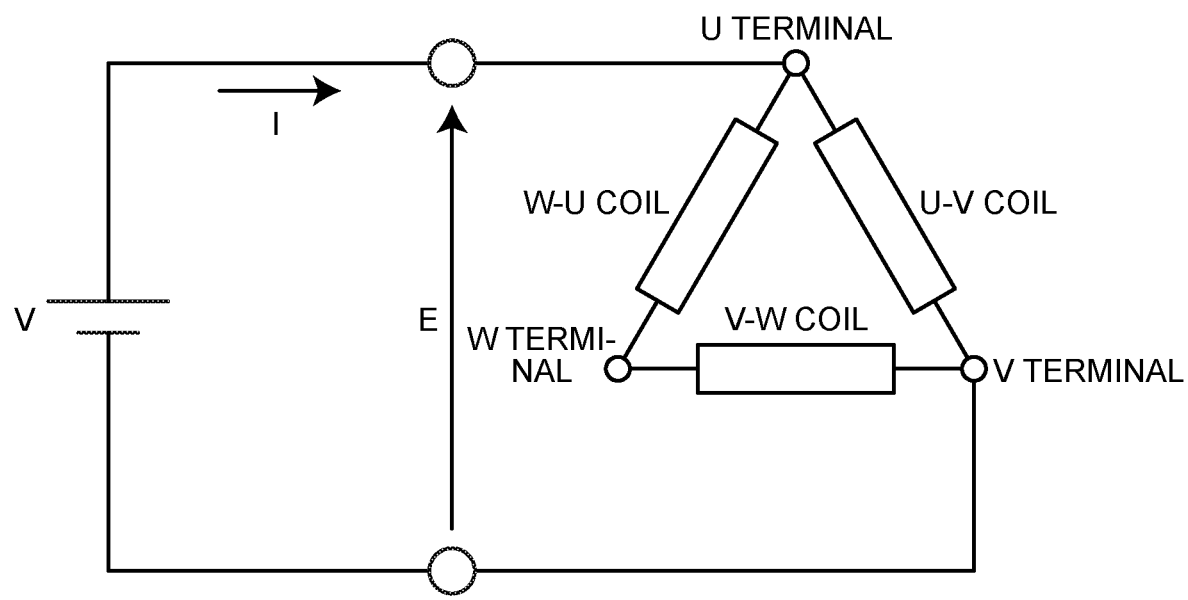
FIG. 33 shows a portion of the motor in FIG. 32 replaced by the wiring structure of the coils.

Next, the theoretical unloaded rotational speed will be explained. FIG. 32 shows a simple equivalent circuit of the motor. FIG. 33 shows a portion of the motor shown in FIG. 32 replaced by the wiring structure of the coils. Theoretical unloaded rotational speed ω refers to the rotational speed at which the motor can theoretically rotate when drive voltage V is impressed and external disturbance is not considered. When mechanical losses are not considered, the drive voltage V, induced voltage E, current I, and motor resistance R are related as shown in Equation (4) below.

Mathematical Equation 4

$$V = Eb + IR \quad (4)$$

The rotational speed of the motor is determined such that an induced voltage E that balances the left and right sides of Equation (4) is generated. In Equation (4), because an extrinsic factor, i.e. current I, is included as is, the drive voltage is affected by external disturbances such as motor design and circuit design. To make it so that external disturbances are not included, the ideal state, in which current I is zero, is assumed, and the theoretical unloaded rotational speed is defined as the rotational speed of the rotor at which V=E holds. "Current I is zero" means the state in which the connections with the terminals of the motor shown in FIG. 33 are open.

Investigation Results

FIG. 34 is a table that shows the relationships among drive voltage V (i.e. peak V), theoretical unloaded rotational speed N, motor resistance R, induced voltage constant k, and coefficient α for an 8-pole/6-slot motor. In other words, the table shown in FIG. 34 shows values (calculation results) of induced voltage constant k and coefficient α calculated by changing drive voltage V, theoretical unloaded rotational speed N, and motor resistance R for an 8-pole/6-slot (8P6S) combination. More specifically, induced voltage constant K and coefficient α were studied when the drive voltage V was set to 36 V, 18 V, or 72 [V], the theoretical unloaded rotational speed ω was set to 4,000 rpm, 5,000 rpm, 12,000 rpm, 15,000 rpm, 20,000 rpm, 25,000 rpm, 30,000 rpm, 35,000 rpm, or 40,000 rpm, and the motor resistance R was set to 15 mΩ, 20 mΩ, 30 mΩ, 80 mΩ, or 100 mΩ. In the table, "○" indicates that both of the calculated values of induced voltage constant k and coefficient α fall within ranges defined in Conditions 1, 2, and 3 discussed below, and "X" indicates that at least one of the calculated values of induced voltage constant k and coefficient α does not fall within ranges defined in each of Conditions 1, 2, and 3. For example, for the conditions in which the drive voltage is 36V, the rotational speed is 5,000 rpm, and the motor resistance is 20 mΩ, the calculated value of induced voltage constant k was 7.20 and the calculated coefficient α was 0.39, both of which fall within the ranges defined in each of Condition 1 (k: 0.9-7.2; α: 0.39-24.69), Condition 2 (k: 1.44-7.2; α: 0.39-9.65), and Condition 3 (k: 2.4-7.2; α: 0.39-3.47). Thus, the three cells respectively under Conditions 1, 2 and 3 in the top row of the table shown in FIG. 34 are each indicated as "○".

Thus, as shown in FIG. 34, induced voltage constant k [V/krpm] and coefficient α [mΩ/(V/krpm)$^2$] preferably satisfy one or more of Condition 1, Condition 2, and Condition 3 below.

[Condition 1]

Satisfaction of the conditions below.

$0.9 \leq k \leq 7.2$ $0.39 \leq \alpha \leq 24.69$

[Condition 2]

Satisfaction of the conditions below.

$1.44 \leq k \leq 7.2$ $0.39 \leq \alpha \leq 9.65$

[Condition 3]
Satisfaction of the conditions below.

$2.4 \leq k \leq 7.2$ $0.39 \leq \alpha \leq 3.47$

From the data shown in FIG. 34, the following insights were obtained. At the drive voltage 36V, it is possible for a motor having an 8-pole/6-slot combination to ensure almost entirely the design ranges of: a rotational speed (5,000 rpm) for motors of self-propelled vehicles such as delivery carts; rotational speeds (12,000-15,000 rpm) for motors of chain saws; and rotational speeds (20,000-30,000 rpm) for motors of electrical tools. At the drive voltage 18V, it is possible for a motor having an 8-pole/6-slot combination to ensure the design ranges of a rotational speed (5,000 rpm) for motors of self-propelled vehicles such as delivery carts and rotational speeds (12,000-15,000 rpm) for motors of chain saws, but it is difficult to ensure a design range of rotational speed (20,000-30,000 rpm) for motors of electrical tools. At the drive voltage 72V, it is possible for a motor having an 8-pole/6-slot combination to ensure the design ranges of rotational speeds (12,000-15,000 rpm) for motors of chain saws and rotational speeds (20,000-30,000 rpm) for motors of electrical tools (power tools), but it is difficult to ensure a design range of rotational speed (5,000 rpm) for motors of self-propelled vehicles such as delivery carts.

Effects

According to the embodiment as explained above, the electric work machine 1 comprises: the motor 6, which is an inner-rotor-type brushless motor, comprising the rotor 30 and the stator 20, which is disposed around (surrounds) the rotor 30; and the saw chain 10, which is the output part that is directly or indirectly driven by the rotor 30. The rotor 30 comprises the rotor core 31 and the permanent magnets 33, which are fixed to the rotor core 31. The stator 20 comprises the stator core 21, the front insulator 22 and the rear insulator 23, which are fixed to the stator core 21, and the coils 24, which are respectively wound on the teeth 21T of the stator core 21 via the front insulator 22 and the rear insulator 23. The pole count, which indicates the number of the permanent magnets 33 (more particularly, the number of permanent magnets 33 that are disposed equispaced in a circumferential direction of the rotor core 31 along a virtual circumscribed circle defined in a plane perpendicular to a rotational axis of the rotor core 31), is eight. The slot count, which indicates the number of the coils 24, is six.

By configuring the motor 6, which is an inner-rotor-type brushless motor used as the motive power source of the electric work machine 1, as an 8-pole/6-slot motor, the motor 6 can be made more compact.

Other Embodiments

It is noted that, in the embodiment described above, it was assumed that the motor 6 is an interior permanent magnet (IPM) motor. However, the motor 6 may instead be a surface permanent magnet (SPM) motor, in which the permanent magnets are affixed to (on) the outer surface of the rotor core 31.

In the embodiment described above, it was assumed that the electric work machine 1 is a chain saw, which is one type of horticulture tool (outdoor power equipment). Horticulture tools or outdoor power equipment according to the present teachings are not limited to a chain saw. Illustrative examples of horticulture tools according to the present teachings include hedge trimmers, lawn mowers, mowing machines, blowers, etc.

In the embodiment described above, it was assumed that the electric work machine 1 is a horticulture tool. However, electric work machines 1 according to the present teachings may be power tools. Illustrative examples of power tools according to the present teachings include impact drivers, driver-drills, hammer driver-drills, angle drills, screwdrivers, hammers, hammer drills, circular saws, reciprocating saws, etc.

In addition, the electric work machine may be a vacuum cleaner.

In the embodiment described above, it was assumed that the battery packs 12, which are mounted on the battery-mounting parts, are used as the power supply of the electric work machine. However, a commercial power supply (AC power supply) may instead be used as the power supply of the electric work machine.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved electric work machines, such as outdoor power equipment and power tools that utilize an electric motor as its drive source.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Electric work machine
2 Housing
2A Motor-housing part
2B Battery-holding part
2C Rear-grip part
3 Front-grip part
4 Hand guard
5 Battery-mounting part
6 Motor
7 Trigger switch
8 Trigger-lock lever
9 Guide bar 10 Saw chain
11 Controller
12 Battery pack
17 Fan
18 Screw
19 Through hole
20 Stator
21 Stator core
21T Tooth
22 Front insulator
22D Screw hole
22P Protruding part
22S Support part
22T Protruding part
23 Rear insulator
23T Protruding part
24 Coil
24U U-phase coil
24U1 U-phase coil
24U2 U-phase coil
24V V-phase coil
24V1 V-phase coil
24V2 V-phase coil
24W W-phase coil
24W1 W-phase coil
24W2 W-phase coil
25 Power-supply line
25U U-phase power-supply line
25V V-phase power-supply line
25 W W-phase power-supply line
26 Fusing terminal
26U U-phase fusing terminal
26V V-phase fusing terminal
26W W-phase fusing terminal
27 Short-circuiting member
27A Opening
27U U-phase short-circuiting member
27V V-phase short-circuiting member
27W W-phase short-circuiting member
28 Insulating member
28A Body part
28B Screw-boss part
28C Support part
28D Opening
29 Connection wire
29E Winding-end portion
29S Winding-start portion
30 Rotor
31 Rotor core
31F Front-end part
31R Rear-end part
31S Outer surface
32 Rotor shaft
33 Permanent magnet
37 Opening
40 Sensor board
41 Plate part
42 Screw-boss part
43 Magnetic sensor
44 Signal line
45 Opening
50 Magnet hole
71 Gap
73 Resin

The invention claimed is:

1. An electric work machine comprising:
a brushless motor comprising a rotor and a stator disposed around the rotor; and
an output part configured to be directly or indirectly driven by the rotor;
wherein:
the rotor comprises a rotor core and eight permanent magnets fixed to the rotor core;
the stator comprises a stator core, one or more insulators fixed to the stator core, and six coils respectively wound on six teeth of the stator core via the insulator(s);
the brushless motor has an induced voltage constant k that satisfies the condition below:

$0.9 \leq k \leq 7.2$, the induced voltage constant k is calculated from the equation $E/\omega$;
E is an induced voltage of the brushless motor in volts; and
$\omega$ is a rotational speed of the rotor of the brushless motor in kilorevolutions per minute (krpm).

2. The electric work machine according to claim 1, wherein the brushless motor has a coefficient $\alpha$ that satisfies the condition below:

$0.39 \leq \alpha \leq 24.69$, wherein:
the coefficient $\alpha$ is calculated from the equation $R/k^2$; and
R is the motor resistance of the brushless motor in m$\Omega$.

3. The electric work machine according to claim 1, wherein the outer diameter A of the stator core satisfies the condition below:

$45 \text{ mm} \leq A \leq 70 \text{ mm}$.

4. The electric work machine according to claim 3, wherein the outer diameter A of the stator core in mm and the outer diameter G of the rotor core in mm satisfy the condition below:

$0.5 \times A \leq G \leq 0.65 \times A$.

5. The electric work machine according to claim 3, wherein the outer diameter A of the stator core in mm, and the length C of each tooth in the circumferential direction in mm satisfy the condition below:

$0.06 \times A \leq C \leq 0.114 \times A$.

6. The electric work machine according to claim 5, wherein the length D of the yoke of the stator core in the radial direction in mm and C satisfy the condition below:

$0.5 \times C \leq D \leq 0.5 \times C + 2$.

7. The electric work machine according to claim 1, wherein the outer diameter A of the stator core satisfies the condition below:

$45 \text{ mm} \leq A \leq 65 \text{ mm}$.

8. The electric work machine according to claim 1, wherein the outer diameter A of the stator core satisfies the condition below:
$45 \text{ mm} \leq A \leq 60 \text{ mm}$.

9. The electric work machine according to claim 1, wherein the thickness H of each of the permanent magnets in the radial direction in mm satisfies the condition below:

$2.0 \leq H \leq 4.0$.

10. The electric work machine according to claim 1, wherein the length J of an air gap between the stator core and the rotor core in the radial direction in mm satisfies the condition below:

$$0.4 \leq J \leq 0.6.$$

11. The electric work machine according to claim 1, wherein the stator core has a length K in an axial direction of 50 mm or less.

12. The electric work machine according to claim 11, wherein the length L of the rotor core in the axial direction in mm satisfies the condition below:

$$K \leq L \leq K+10.$$

13. The electric work machine according to claim 1, further comprising one or more magnetic sensors configured to detect rotation of the rotor.

14. The electric work machine according to claim 1, wherein the six coils are delta connected.

15. The electric work machine according to claim 1, wherein the eight permanent magnets are disposed equispaced in a circumferential direction of the rotor core along a virtual circumscribed circle defined in a plane perpendicular to a rotational axis of the rotor core.

16. An electric work machine comprising:
 a brushless motor comprising a rotor and a stator disposed around the rotor; and
 an output part configured to be directly or indirectly driven by the rotor;
 wherein:
 the rotor comprises a rotor core and eight permanent magnets fixed to the rotor core such that the rotor has a pole count of eight;
 the stator comprises a stator core, one or more insulators fixed to the stator core, and six coils respectively wound on six teeth of the stator core via the insulator(s); and
 the brushless motor has an induced voltage constant k that satisfies the condition below:

$$2.4 \leq k \leq 72.$$

the induced voltage constant k is calculated from the equation $E/\omega$;
 E is an induced voltage of the brushless motor in volts; and
 $\omega$ is a rotational speed of the rotor of the brushless motor in kilorevolutions per minute (krpm).

17. The electric work machine according to claim 16, wherein the brushless motor has a coefficient $\alpha$ that satisfies the condition below:

$$0.39 \leq \alpha \leq 3.47,$$

wherein:
 the coefficient $\alpha$ is calculated from the equation $R/k^2$; and
 R is the motor resistance of the brushless motor in m$\Omega$.

18. An electric work machine comprising:
 a brushless motor comprising a rotor and a stator disposed around the rotor; and
 an output part configured to be directly or indirectly driven by the rotor;
 wherein:
 the rotor comprises a rotor core and eight permanent magnets fixed to the rotor core;
 the stator comprises a stator core, one or more insulators fixed to the stator core, and six coils respectively wound on six teeth of the stator core via the insulator(s);
 the brushless motor has an induced voltage constant k that satisfies the condition below:

$$1.44 \leq k \leq 7.2,$$

the induced voltage constant k is calculated from the equation $E/\omega$;
 E is an induced voltage of the brushless motor in volts; and
 $\omega$ is a rotational speed of the rotor of the brushless motor in kilorevolutions per minute (krpm).

19. The electric work machine according to claim 18, wherein the brushless motor has a coefficient $\alpha$ that satisfies the condition below:

$$0.39 \leq \alpha \leq 9.65,$$

wherein:
 the coefficient $\alpha$ is calculated from the equation $R/k^2$; and
 R is the motor resistance of the brushless motor in m$\Omega$.

* * * * *